US008810848B2

(12) United States Patent
Nakajima et al.

(10) Patent No.: US 8,810,848 B2
(45) Date of Patent: Aug. 19, 2014

(54) IMAGE FORMING APPARATUS FOR SELECTING PAGES FOR N-UP PRINTING

(71) Applicants: Takeshi Nakajima, Tokyo (JP); Tomohiro Iwase, Tokyo (JP)

(72) Inventors: Takeshi Nakajima, Tokyo (JP); Tomohiro Iwase, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/894,374

(22) Filed: May 14, 2013

(65) Prior Publication Data

US 2013/0278970 A1      Oct. 24, 2013

Related U.S. Application Data

(62) Division of application No. 12/429,101, filed on Apr. 23, 2009, now abandoned.

(30) Foreign Application Priority Data

May 12, 2008  (JP) ................................ 2008-125259
May 19, 2008  (JP) ................................ 2008-130800

(51) Int. Cl.
*G06K 15/00* (2006.01)

(52) U.S. Cl.
USPC .......... 358/1.18; 345/629; 358/1.13; 358/1.2; 358/2.1; 358/450; 382/195; 715/201

(58) Field of Classification Search
USPC ........... 358/1.18, 1.11, 1.13, 1.15, 1.16, 1.17, 358/1.2, 1.9, 2.1, 296, 450, 462; 345/629; 375/240.03; 382/100, 112, 195, 224, 382/239; 386/223, 282; 396/374; 700/9; 705/1.1; 715/201, 205, 234
See application file for complete search history.

(56) References Cited

U.S. PATENT DOCUMENTS

| | | | | |
|---|---|---|---|---|
| 5,357,348 A * | 10/1994 | Moro | ............................. | 358/450 |
| 6,667,814 B1 * | 12/2003 | Tillotson | ...................... | 358/1.15 |
| 7,248,386 B2 * | 7/2007 | Nishi | ............................ | 358/1.2 |
| 2002/0051205 A1 * | 5/2002 | Teranishi et al. | ............ | 358/1.18 |
| 2002/0069228 A1 * | 6/2002 | Mori et al. | ...................... | 707/524 |
| 2003/0160975 A1 * | 8/2003 | Skurdal et al. | ................. | 358/1.2 |
| 2004/0046999 A1 * | 3/2004 | Watanabe et al. | ............ | 358/1.16 |
| 2006/0170957 A1 * | 8/2006 | Niebling et al. | ............. | 358/1.15 |
| 2006/0280427 A1 * | 12/2006 | Snowdon et al. | ............... | 386/46 |

(Continued)

FOREIGN PATENT DOCUMENTS

| | | | | |
|---|---|---|---|---|
| JP | 2005189439 A * | 7/2005 | ............. | G03G 21/00 |
| JP | 2007043494 A * | 2/2007 | | |

*Primary Examiner* — David S Cammack
(74) *Attorney, Agent, or Firm* — Squire Patton Boggs (US) LLP

(57) ABSTRACT

There is described an image processing apparatus, which makes it possible not only to eliminate the deterioration of the perceptibility, but also to determine the pages being suitable for applying the predetermined image processing. The control section determines specific pages, being suitable for applying a predetermined image processing, based on the attributes detected by the detecting section, so as to apply the predetermined image processing to the specific pages. On the other hand, the control section applies image processing, including a variable power processing, to both the partial image area and the partial character area by employing different magnification factors, so as to generate a size-changed partial image area and a size-changed partial character area, and to arrange both of them into a predetermined imaginary area being smaller than an area of the original image, so as to accommodate them within the predetermined imaginary area.

17 Claims, 15 Drawing Sheets

(56) References Cited

U.S. PATENT DOCUMENTS

| | | | |
|---|---|---|---|
| 2007/0076960 A1* | 4/2007 | Takamori et al. | 382/224 |
| 2007/0133057 A1* | 6/2007 | Fukunishi | 358/1.18 |
| 2008/0079963 A1* | 4/2008 | Matsubara | 358/1.9 |
| 2008/0158604 A1* | 7/2008 | Mochizuki | 358/1.17 |

* cited by examiner

VARIABLE MAGNIFICATION FACTOR
OF PARTIAL IMAGE AREA IS SET AT
100% (IMAGE PRIORITY CASE)

VARIABLE MAGNIFICATION FACTOR
OF PARTIAL IMAGE AREA IS SET AT
70% (CHARACTER PRIORITY CASE)

FITTING PARTIAL IMAGE AREA OF DOCUMENT
WITHIN LEFT-HALF PAGE AREA OF IMAGINARY
AREA WITHOUT CHANGING SIZE OF PARTIAL
IMAGE AREA, AND THEN, MOVING PARTIAL IMAGE
AREA TOWARD CORNER OF LEFT-HALF PAGE
AREA AT WHICH PARTIAL IMAGE AREA IS NOT
SURROUNDED BY CHARACTERS

CHANGING SIZE OF FIRST CHARACTER BLOCK SO AS TO MATCH ITS SIZE WITH SIZE OF ARRANGING AREA

CHANGING SIZE OF OTHER CHARACTER BLOCK, AND THEN, ARRANGING OTHER CHARACTER BLOCK IN SAME MANNER

DETECTING ARRANGING AREA ONTO WHICH FIRST CHARACTER BLOCK IS TO BE POSITIONED

ARRANGING SIZE-ADJUSTED FIRST CHARACTER BLOCK INTO ARRANGING AREA

IMAGE FORMING APPARATUS FOR SELECTING PAGES FOR N-UP PRINTING

This is a Divisional Patent Application of U.S. patent application Ser. No. 12/429,101, filed Apr. 23, 2009, which claimed priority under 35 U.S.C. 119 to JP2008-125259 and JP2008-130800, respectively filed on May 12 and 19, 2008 with Japan Patent Office, all of which are incorporated by references.

BACKGROUND OF THE INVENTION

The present invention relates to an image processing apparatus, and specifically relates to an image processing apparatus provided with a function for changing a size of an image, and an image processing apparatus provided with a function for applying image processing to image data representing an image for every page.

Generally speaking, an image forming apparatus, such as a copier, a Multi-Functional Peripheral, etc., is provided with a variable power function for changing a size of an original document, such as a document image, an image file, etc., so as to print the size-changed image on a recording medium. Further, most of the abovementioned image forming apparatus is generally provided with plural kinds of variable power functions including, for instance, a magnification designated variable power function for changing the variable power based on the magnification factor designated by the user, a fixed size variable power function for setting a degree of the variable power based on the fixed size designated by the user, etc. Still further, generally speaking, the abovementioned image forming apparatus is also provided with an integration printing function, called the "N-in-1 printing". According to the integration printing function, sizes of images respectively included in plural pages (N pages) are reduced by applying the variable power processing to the images concerned, so as to integrally print the reduced images onto a single page. Sometimes, this kind of the integration printing function has bee used in the charged copy service by the user, in order to reduce a number of printing sheets so as to save the copy charge.

On the other hand, with respect to reduction of the copy charge in the field of the charged copy service, for instance, Tokkai 2000-4316 (Japanese Non-Examined Laid-Open Patent Publication) sets forth a technology for reducing a number of color printing operations so as to save an amount of the copy charge. According to the abovementioned technology, only partial monochrome images extracted from a document, including plural pages in which the partial monochrome images and partial color images are intermingled with each other, are printed on the pages to be copied, prior to the partial color images after the operations for reading the document images are completed, and then, the partial color images are allotted onto the pages so as to print the partial color images as a whole, thereafter. Further, Tokkai 2006-85103 (Japanese Non-Examined Laid-Open Patent Publication) sets forth another technology, which makes it possible to automatically select a set of print settings corresponding to a copy charge desired by the user, when the user inputs a desired amount of the copy charge in advance.

Further, as for the other function for changing an image size, well-known is such a function that a size of an area desired by the user is partially changed according to the operations conducted by the user, for instance, an editing function for enlarging or reducing the image size by touching the image area and/or the character area displayed on the editing apparatus (editor) concerned, with a touch pen, etc., directly by the user, etc.

However, according to the reduction variable power operation to be performed in the conventional variable power function or the conventional integration printing function, the size of the whole image concerned is reduced at a constant variable magnification factor irrespective of a portion of either an image area or a character area. For instance, in the case of 2 in 1 printing, the image size for 1 page is reduced to that of 0.7 times of the original (variable magnification factor; 70%, area ratio; 50%), while, in the case of 4 in 1 printing, the image size for 1 page is reduced to that of 0.5 times of the original (variable magnification factor; 50%, area ratio; 25%). Accordingly, depending on the original sizes of each of the concerned images and/or the variable magnification factor employed, sometimes, a photographic image portion has specifically become difficult to be recognized, or conversely, characters have been hardly perceptible due to the smudges of the characters, resulting in drastic deterioration of the perceptibility of them.

It has been impossible to overcome the abovementioned drawbacks in the conventional image processing apparatus, even if the technologies set forth in Tokkai 2000-4316 and Tokkai 2006-85103 (Japanese Non-Examined Laid-Open Patent Publications) are employed in the image processing apparatus. In addition, since the editing function, etc., provided in the editing apparatus abovementioned, requires the user to perform complicated operation, such the functions are not suitable for the general purpose copiers or the multifunctional Peripheral, etc., aforementioned.

On the other hand, in a copier, etc., which provides the charged copy-printing service, an amount of the charged fee is determined corresponding to the print settings inputted by the user. If the user well recognizes the amount of the charged fee corresponding to the print settings in advance, no problem would arise with respect to the abovementioned copier. However, when the user does not well recognize, it would possibly occur that the user repeatedly conducts the setting and changing operations until he is satisfied with the required copy charge and the print quality proposed by the copier concerned. This results in a considerable burden for the user. To overcome the abovementioned drawback, some copiers make it possible for the user to input the upper limit of money amount (desired charge amount), so that, when the actual amount of copy fee corresponding to the print settings inputted by the user exceeds the upper limit of money amount, the amount of charged fee is suppressed by conducting a predetermined image processing.

For instance, Tokkai 2007-43494 (Japanese Non-Examined Patent Publication) sets forth the technology including: retrieving an image processing, which is implementable within a range of the upper limit of money amount, from plural kinds of image processing, based on the difference between the charged fee and the upper limit of money amount; when a suitable image processing can be retrieved, proposing its preview screen and the amount of copy fee to be actually charged to the user concerned; when the suitable image processing can not be retrieved, selecting a desired image processing by the user himself, or conducting an changing operation, such as selecting parameters of the concerned processing, etc., so as to suppress the amount of charged fee; and further, applying an image processing, which is such a processing that lowers the printing density, reduces the image size, or the like, preferentially to an area being suitable for the processing (color area) or a partial image area, both residing within the range of the processing objective image area. Still further, when the user has designated in advance a mode of giving priority to either the amount of charged fee or the image quality for every page, only the pages for which the mode of giving priority to the amount of charged fee is designated are made to be the object of the image processing abovementioned.

When the image processing is conducted for every partial area included in the image concerned as mentioned in the above, the calculating operation of the charged fee becomes complicated, compared to such a case that the image processing is conducted for every page, etc. Further, layout positional relationships and/or contrasting density relationships within one page would be destroyed.

Further, when an image processing that makes the copy fee fall within the range of the upper limit of money amount, the image processing is applied to all of the areas for which the concerned image processing is suitable, with respect to the whole document including plural pages. For instance, when the areas for which the concerned image processing is suitable exist over the all pages of the document, the concerned image processing is applied to all of the pages. Accordingly, there has been a fear that the concerned image processing is applied to the pages more than necessary for the upper limit of money amount. In addition, in order to select specific pages to be object for the image processing, the user should manually operate the copier, resulting in a complication of the operation.

SUMMARY OF THE INVENTION

To overcome the abovementioned drawbacks in conventional image processing apparatus, it is one of objects of the present invention to provide an image processing apparatus, which makes it possible to eliminate the deterioration of the perceptibility in regard to a partial image area or a partial character area without conducting complicated operations when reducing the size of the image.

Further, it is another one of objects of the present invention to provide an image processing apparatus, which makes it possible to determine the pages being suitable for applying the predetermined image processing, while alleviating the burden to be incurred to the user.

Accordingly, at least one of the objects of the present invention can be attained by any one of the image processing apparatuses described as follows.

(1) According to an image processing apparatus reflecting an aspect of the present invention, the image processing apparatus comprises: an image data acquiring section to acquire image data representing an original image; a detecting section to detect a partial image area and a partial character area, both of which are included in the original image, based on the image data outputted by the image data acquiring section; and a control section to apply image processing, including a variable power processing, to both the partial image area and the partial character area by employing a first variable magnification factor and a second variable magnification factor, which are different from each other, respectively, so as to generate a size-changed partial image area and a size-changed partial character area, and to arrange both the size-changed partial image area and the size-changed partial character area into a predetermined imaginary area being smaller than an area of the original image, so as to accommodate them within the predetermined imaginary area.

(2) According to another aspect of the present invention, in the image processing apparatus recited in item 1, the control section applies the variable power processing to any one of the partial image area and the partial character area by employing a predetermined variable magnification factor so as to arrange the size-changed one into the imaginary area, while applies the variable power processing to another one of the partial image area and the partial character area by employing such a specific variable magnification factor that makes it possible to accommodate the other size-changed one within a residual area remained in the imaginary area.

(3) According to still another aspect of the present invention, in the image processing apparatus recited in item 1 or item 2, the control section applies an integration print processing, included in the image processing, to plural pages included in the original image so as to integrate the plural pages into a single page; and the control section applies the variable power processing, included in the image processing, to both the partial image area and the partial character area by employing the first variable magnification factor and the second variable magnification factor, which are different from each other, to arrange both the size-changed partial image area and the size-changed partial character area into the predetermined imaginary area being same as an area of the single page.

(4) According to still another aspect of the present invention, in the image processing apparatus recited in any one of items 1-3, the first variable magnification factor to be employed for changing a size of the partial image area is greater than the second variable magnification factor to be employed for changing a size of the partial character area.

(5) According to still another aspect of the present invention, in the image processing apparatus recited in any one of items 1-4, the control section sets the first variable magnification factor at 100%.

(6) According to still another aspect of the present invention, in the image processing apparatus recited in any one of items 1-3, the second variable magnification factor to be employed for changing a size of the partial character area is greater than the first variable magnification factor to be employed for changing a size of the partial image area.

(7) According to still another aspect of the present invention, in the image processing apparatus recited in any one of items 1, 2, 3 and 6, the control section sets the second variable magnification factor at 100%.

(8) According to still another aspect of the present invention, in the image processing apparatus recited in any one of items 1-7, in the image processing, the control section divides the partial character area into a plurality of character blocks, each of which includes a plurality of consecutive characters, and then, applies the variable power processing to each of the plurality of character blocks so as to generate a plurality of size-changed character blocks, and then, arranges the plurality of size-changed character blocks within a residual area remained after arranging the size-changed partial image area in the imaginary area.

(9) According to still another aspect of the present invention, in the image processing apparatus recited in any one of items 1-7, in the image processing, the control section divides the partial character area into a plurality of character images, each of which represents each of characters included in the partial character area, to apply the variable power processing to each of the plurality of character images so as to generate a plurality of size-changed character images, and then, arranges the plurality of size-changed character images within a residual area remained after arranging the size-changed partial image area into the imaginary area.

(10) According to still another aspect of the present invention, the image processing apparatus recited in any one of items 1-9, further comprises: a selecting section to accept a selecting operation for selecting any one of the partial image area and the partial character area, to which a priority is to be given by overriding the other one; wherein the control section changes the first variable magnification factor and the second variable magnification factor respectively and independently from each other, corresponding to a priority order of them, determined as a result of the selecting operation accepted by the selecting section.

(11) According to still another aspect of the present invention, the image processing apparatus recited in any one of items 1-10, further comprises: an operating section to accept operations for establishing setting items in regard to a printing operation based on the original image and for inputting an upper limit of money amount to be charged for the printing operation; wherein the control section compares the upper limit of money amount, inputted from the operating section, with a charged fee to be actually charged when the printing operation is implemented according to the setting items established from the operating section, so as to perform the image processing when the charged fee exceeds the upper limit of money amount.

(12) According to yet another aspect of the present invention, in the image processing apparatus recited in any one of items 1-11, the control section perform the image processing when a residual amount of printing agent, to be used for a printing operation based on the original image, is lower than a predetermined lower limit of the printing agent.

(13) According to an image processing apparatus reflecting another aspect of the present invention, the image processing apparatus, comprises: an image data acquiring section to acquire image data representing an original image; a detecting section to detect attributes of each of pages included in the original image represented by the image data acquired by the image data acquiring section; and a control section to determine specific pages, being suitable for applying a predetermined image processing, among the pages included in the original image, based on the attributes detected by the detecting section, so as to apply the predetermined image processing to the specific pages.

(14) According to still another aspect of the present invention, in the image processing apparatus recited in item 13, the control section also determines a priority order of the specific pages to which the predetermined image processing is to be applied, based on the attributes detected by the detecting section.

(15) According to still another aspect of the present invention, in the image processing apparatus recited in item 14, the attributes include plural kinds of attributes, and the priority order is determined by weighting each of the plural kinds of attributes corresponding to contents of the predetermined image processing.

(16) According to still another aspect of the present invention, in the image processing apparatus recited in any one of items 13-15, when applying the predetermined image processing to the specific pages as a single set of processing objects, the control section employs a combination of the attributes in regard to each of the specific pages as one of criteria for determining the specific pages.

(17) According to still another aspect of the present invention, in the image processing apparatus recited in any one of items 13-16, the attributes includes at least one of a size of characters residing on a page serving as one of the pages, a size of a partial image area residing on the page concerned, a kind of the partial image area residing on the page concerned, a kind of color used for the page concerned and a density of whole image itself included in the page concerned.

(18) According to still another aspect of the present invention, the image processing apparatus recited in any one of items 13-17, further comprises: an operating section to accept operations for establishing setting items in regard to a printing operation based on the original image and for inputting an upper limit of money amount to be charged for the printing operation; wherein the control section compares the upper limit of money amount, inputted from the operating section, with a charged fee to be actually charged when the printing operation is implemented according to the setting items established from the operating section, so as to apply the predetermined image processing, which makes it possible to reduce the charged fee, to the specific pages determined in advance, when the charged fee exceeds the upper limit of money amount.

(19) According to still another aspect of the present invention, in the image processing apparatus recited in any one of items 13-18, when a residual amount of printing agent, to be used for a printing operation based on the original image, is lower than a predetermined lower limit of the printing agent, the control section apply the predetermined image processing, which makes it possible to reduce a consuming amount of the printing agent to a level lower than that in a normal printing operation, to the specific pages determined in advance.

(20) According to still another aspect of the present invention, in the image processing apparatus recited in any one of items 13-19, the control section applies an integration print processing, serving as the predetermined image processing in which the specific pages are integrated and printed into a single page area, to the specific pages.

(21) According to still another aspect of the present invention, in the image processing apparatus recited in any one of items 13-20, the control section applies a duplex print processing, serving as the predetermined image processing in which a single pair or plural pairs of the specific pages are respectively printed onto both sides of a single paper sheet or plural paper sheets, to the specific pages.

(22) According to yet another aspect of the present invention, in the image processing apparatus recited in any one of items 13-21, the control section applies such an image processing, serving as the predetermined image processing, that makes it possible to reduce a consuming amount of printing agent to a level lower than that in a normal printing operation, to the specific pages.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
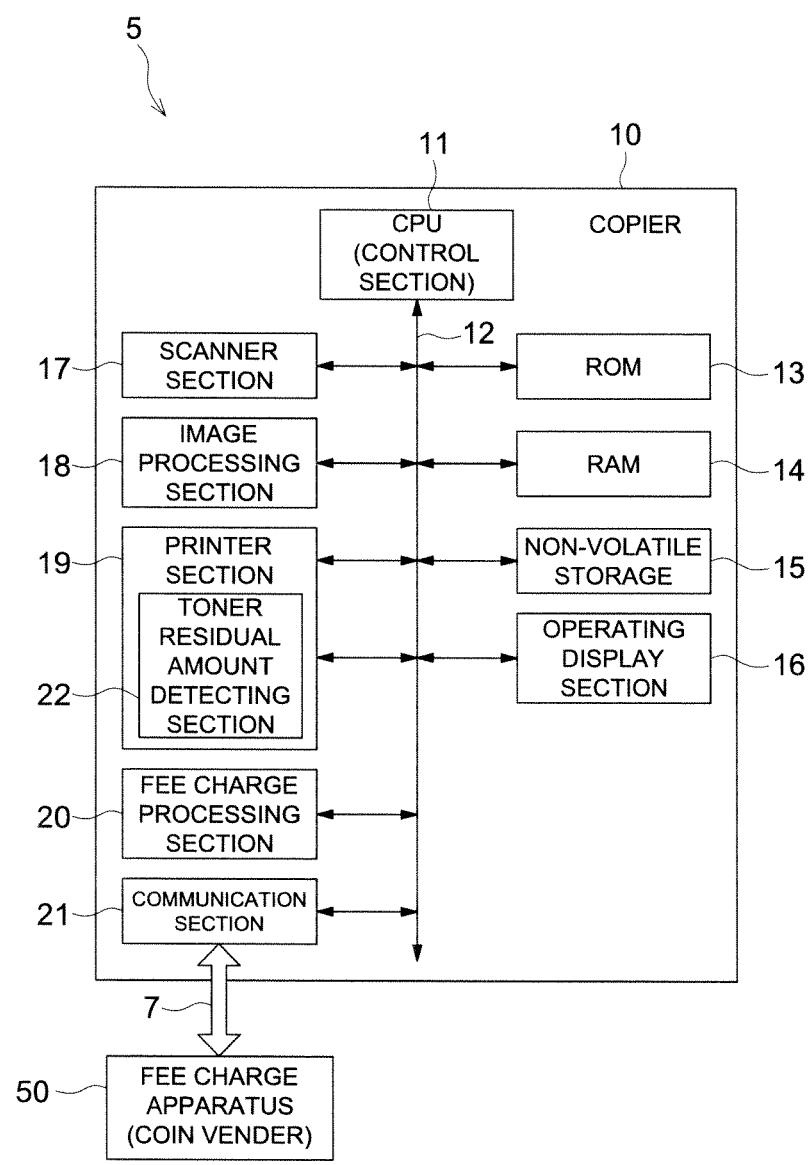
FIG. 1 shows a block diagram indicating a rough configuration of a copier installed in a copy fee charging system embodied in the present invention.

Referring to the drawings, the preferred embodiments of the present invention will be detailed in the following.

Initially, the terminology employed hereinafter in this specification will be defined in the following. In the present specification, the term of a "partial image area" is different from that of an "image" to be specified otherwise in its implications (however, the term of an "image size" is excluded). For instance, the term of a "partial image area" indicates a graphic chart (such as, a graph, an illustration, a schematic diagram, etc.), a photographic image, etc., while the term of an "image size" indicates a size (dimension) of a graphic chart, a photographic image, etc. On the other hand, the term of a "partial character area" indicates a sectional portion or an area, in which a certain kind of characters are utilized for describing a character string, some sentence, etc. Further, characters written on a graphic chart or a photographic image are regarded as inclusions of a "partial image area" defined in the above.

FIG. 1 shows a block diagram indicating a rough configuration of a copier 10 installed in a copy fee charging system 5. The copy fee charging system 5 provides a pay copy service, and is constituted by the copier 10 and a fee charge apparatus 50, which are coupled to each other through a communication cable 7 so as to make the communication between them possible.

The copier 10 serves as an apparatus (image processing apparatus), called a "digital color copier", that is provided with various kinds of functions, such as a color copying function for making a color copy from a document, a color printer function, etc., and, in the copy fee charging system 5, implements copy printing operations in accordance with the inputting operations conducted by the user of the copy service. Further, other than the abovementioned, the various kinds of printing functions to be conducted by the copier 10 include: the integration printing function (N in 1 printing function) for applying the reduction variable power processing to the images included in the plural document pages, so as to integrally print the size-reduced images within one page; a duplex printing function for printing the images, included in the plural document pages, on both sides of a paper sheet; and a toner saving function for saving the consumption amount of toner (printing agent) to be consumed during the printing operation, by lowering the printing density. On the other hand, the fee charge apparatus 50 serves as a coin vender, etc., that receives coins, etc., inserted by the user, so as to collect a suitable amount of fees corresponding to the usage of the service, and in the copy fee charging system 5, conducts the operations for charging fees for the copy service used by the user.

As shown in FIG. 1, the copier 10 is constituted by a CPU (Central Processing Unit) 11 serving as a control section, a ROM (Read Only Memory) 13, a RAM (Random Access Memory) 14, a non-volatile storage 15, an operating display section 16, a scanner section 17, an image processing section 18, a printer section 19, a fee charge processing section 20 and a communication section 21, which are coupled to each other through a bus 12.

The CPU 11 controls various kinds of operations to be conducted in the copier 10 based on programs stored in the ROM 13. The RAM 14 serves as not only a working memory for temporarily storing various kinds of data when the CPU 11 executes the programs, but also an image memory for temporarily storing image data, therein, or the like. The non-volatile storage 15 serves as such a memory that retains the contents of stored data, even if its power source is turned OFF, and stores information being inherent to the apparatus concerned, various kinds of setting information, a condition table 30 detailed later, etc., therein.

Further, the operating display section 16 not only serves as a display section that displays various kinds of operating screens and guiding screens to be used by the user, etc., who uses the copy service provided by the copier 10, but also serves as an operating section and/or a selecting section that accepts various kinds of operations, such as a setting operation, a data inputting operation, a selecting operation, etc., conducted for the copier 10 by the user, etc. The setting items to be accepted by the operating display section 16 include setting items in regard to the printing (print settings), such as a number of printed copies produced through the copy operation of the document image, a printed image quality, a printing size (size of output paper sheet), etc., and other setting items in regard to the copy mode, such as a monochrome or color printing mode to be employed for the copy printing of the document image, a one side or duplex printing mode, etc., and still other setting items. Further, the inputting items to be accepted by the operating display section 16 include inputting items in regard to an upper limit of money amount being allowable for the copy printing operation established by the user (in other words, an amount of copy fees desired by the user), etc. Still further, the selecting items to be accepted by the operating display section 16 include a selecting item for selecting anyone of the partial image area and the partial character area, which overrides the other as the condition for the copy printing operation of the document image, etc. In this connection, hereinafter, the case in which the partial image area overrides the partial character area is referred to as an "image priority case", while the case in which the partial character area overrides the partial image area is referred to as a "character priority case". Still further, in the present embodiment, the operating display section 16 is constituted by a LCD (Liquid Crystal Display), a touch panel mounted on a screen of the LCD and various kinds of switches.

Further, the scanner section 17 has a function for optically reading the document so as to acquire image data representing a color image. For instance, the scanner section 17 is constituted by: a light source to irradiate light onto the document; a color-type image sensor to receive the light reflected from the document so as to read the document in its width direction (main-scanning direction) by one scanning line; a scanning mechanism to move the reading position of the color-type image sensor, which reads the document in a unit of its scanning line, in a longitudinal direction of the document (sub-scanning direction); an optical path that includes various kinds of optical elements, such as a lens, a mirror, etc., so as to guide the light reflected from the document to the color-type image sensor; etc. Further, the image processing section 18 has a function for applying various kinds of image processing, such as an image correction processing, an image rotation processing, a size enlargement/reduction processing, an expansion/compression processing, etc., to the image data.

Still further, the printer section 19 has a function for printing a color image, represented by the image data inputted therein, onto a paper sheet, and then, outputting the printed paper sheet. For instance, the printer section 19 serves as a color laser printer, etc., that is provided with a paper sheet conveying unit, a photoreceptor drum, a charging device, a laser beam emitting unit, a developing device, a transferring separation device, a cleaning device, a fixing device, etc., so as to form a color image on the paper sheet through the electro-photographic process. Further, the printer section 19 is also provided with a toner residual amount detecting section 22.

Yet further, the fee charge processing section 20 has a function for conducting processing operations in regard to the fees to be charged for the copy printing operation implemented by the copier 10. Further, the communication section 21 has a function for communicating with the fee charge apparatus 50 through the communication cable 7, which is coupled to the fee charge apparatus 50.

Now, the first embodiment of the present invention and the second embodiment of the present invention will be separately detailed in the following.

First Embodiment

By executing corresponding one of the programs, the CPU 11 compares an amount of copy charge, to be charged at the time when the copy printing operation established from the operating display section 16 is implemented, and the upper limit of money amount, inputted by the user, with each other, so as to conduct a predetermined image processing, when the amount of copy charge is greater than the upper limit of money amount as a result of the above comparison. It is also applicable that this predetermined image processing is conducted at the time when the residual amount of toner, detected by the toner residual amount detecting section 22 of the printer section 19, is lower than a predetermined lower limit value.

The predetermined image processing abovementioned is such a processing that reduces the number of printed paper-sheets produced from the document images by conducting the copy printing operation employing the integration printing function, namely, the processing that includes an integration processing for reducing the number of printed paper-sheets by integrating the document images of the plural pages into 1 page, and another processing for changing the sizes of the partial image areas and the partial character areas, included in the document images to be integrated, with the different variable magnification factors, so as to arrange all of the partial image areas and the partial character areas within a printing area of 1 page (image processing of partial image area/partial character area individual variable power arrangement).

The FIRST EMBODIMENT of the present invention employs the 2 in 1 print processing for integrating the document images of 2 pages into 1 page, as the integration processing abovementioned. Accordingly, when the size of the document and the printing size is the same as each other, by applying the 2 in 1 print processing to the document images, the size of the processed images are reduced to ½ of the original size (variable magnification factor; 70%, area ratio; 50%). In this connection, hereinafter, the predetermined image processing abovementioned will be also referred to as a "partially separated image processing". Further, hereinafter, each of the term of the "variable magnification factor" and the term of the "reduction factor" indicates a ratio represented by an area ratio.

Further, the CPU 11 also serves as a detecting section to detect the partial image area and the partial character area included in the document image (original image) represented by the image data acquired by the scanner section 17. In order to perform the abovementioned detecting operation, the CPU 11 employs a general purpose algorism for parsing contents of the image data so as to separately discriminate data representing the partial image area and other data representing the partial character area, etc.

Still further, as aforementioned, the CPU 11 employs the integration printing function for reducing the number of printed paper sheets, and creates a print preview screen that satisfies the upper limit of money amount, set by the user, so as to display the created print preview screen on the operating display section 16. Still further, in order to create the print preview screen, the CPU 11 creates an imaginary area (area of outputting use), the size of which is equal to the printing size (size equivalent to that of 1 page of the output paper sheets) established from the operating display section 16, and changes the sizes of the partial image areas and the partial character areas, included in the document images to be integrated, with the variable magnification factors being different from each other, respectively, so as to arrange them within the imaginary area created in advance.

Still further, in the partially separated image processing abovementioned, the CPU 11 performs various kinds of functions including: a function for heightening the variable magnification factor of the partial image areas to a value being higher than that of the partial character areas; another function for changing the sizes of the partial image areas with the predetermined variable magnification factor so as to arrange them in the imaginary area, prior to the partial character areas, and then, changing the sizes of the partial character areas so that the partial character areas can be arranged and accommodated within the residual area of the imaginary area; and still another function for changing the differential values between the variable magnification factors of the partial image areas and those of the partial character areas, corresponding to the priority order selected by the operating display section 16. Concretely speaking with respect to the function for changing the differential values, each of the variable magnification factors corresponding to each of the image prior case and the character prior case, for the partial image areas, are determined in advance, and then, any one of the variable magnification factors is employed corresponding to the selection of either the image prior case and the character prior case, and the variable magnification factor of the partial character areas is changed to an appropriate value corresponding to a size of the residual area abovementioned.

In the FIRST EMBODIMENT of the present invention, the variable magnification factors for the partial image areas are set at 100% (same magnification) for the image prior case and 70% (reduction variable power) for the character prior case, respectively. Further, the variable magnification factor for the partial image areas is set at such a value that is greater than 50%, which is the reduction factor of the document images to be employed in the 2 in 1 mode when the document size and the printing size are the same as each other.

Still further, in the partially separated image processing, the CPU 11 further performs: a function for dividing the partial character area into character blocks for every range in which plural characters are successively continued, and then, applies the variable power processing each of the character blocks divided in advance so as to arrange the processed (size-changed) character blocks within the residual area; and a function for dividing the partial character area into character images for every character and then, applies the variable power processing to each of the character images divided in advance so as to arrange the processed (size-changed) character images within the residual area. In this connection, hereinafter in the present specification, an image acquired by dividing the partial character area for every character (in a unit of one character) is defined as a "character image".

The CPU 11 employs a kind of general-purpose algorism to perform a block recognition processing of the partial character area. For instance, the CPU 11 conducts a character recognition processing by employing an OCR (Optical Character Reader) program, so as to search out a period "." included in the partial character area. Then, the CPU 11 employs a general purpose algorism including the steps of: dividing the period area into 4 areas vertically and horizontally so as to detect the position of the period; determining the head and tail positions of the document image concerned, and determining whether the character string, to which the concerned period is attached, is written in the vertical direction or the horizontal direction; if no character successively continue after the period, determining that the position of the concerned period area is the line brake position; recognizing the character string up to the concerned period as one paragraph; etc., so as to recognize a state of one of the character blocks. Alternatively, it is also possible for the CPU 11 to perform the block recognition processing of the partial character area by employing an algorism other than the abovementioned algorism.

In this connection, other than the CPU 11, the image processing section 18 also performs the partially separated image processing abovementioned. Alternatively, it is also applicable that the image processing section 18 takes partial charge of it.

Yet further, at a predetermined timing when the copy-printed paper sheet (print product) is ejected from the copier 10, the CPU 11 transmits a charging signal to the fee charge apparatus 50 through the communication section 21. For instance, when an ejecting paper sheet counter, mounted in the vicinity of a paper sheet ejecting opening of an ejecting tray (not shown in the drawings), detects the paper sheet, the CPU 11 is triggered to transmit the charging signal. On the other hand, receiving the charging signal from the copier 10, the fee charge apparatus 50 charges the copy fee.

Next, contents of the partially separated image processing, a procedure for creating the print preview and contents of its display screen will be detailed in the following.

Figure 2:
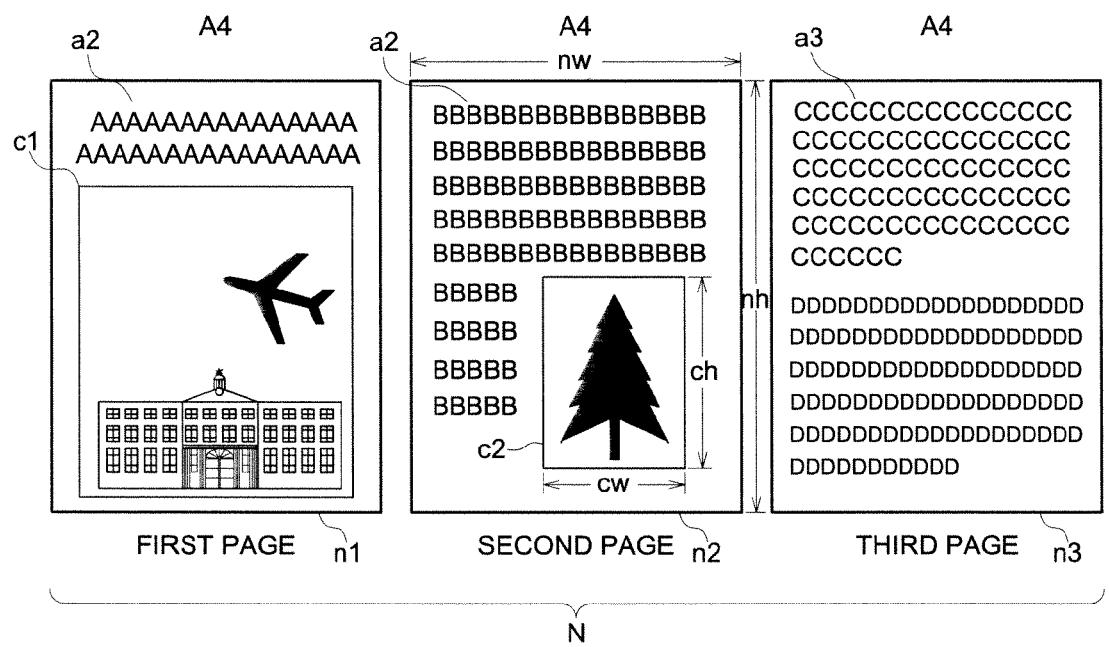
FIG. 2 shows a schematic diagram indicating an example of a document based on which a copier, embodied in the present invention, conducts a copy printing operation.

FIG. 2 shows a schematic diagram indicating an example of a document P based on which the copier 10 conducts the copy printing operation. As shown in FIG. 2, the document P is constituted by plural pages (plural number of paper sheets) including the partial image areas and the partial character areas. Each of the partial image areas represents, for instance, a photographic image, a picture, a graph, a schematic diagram, etc. Concretely speaking, the document P is constituted by 3 pages of A4-size paper sheets including a document P1 serving as Page 1 (first paper sheet) of the document P and a document P2 serving as Page 2 (second paper sheet) of the document P, on each of which the partial character area (a1, a2) and the partial image area (c1, c2) are printed, respectively, and further, a document P3 serving as Page 3 (third paper sheet) of the document P, on which only the partial character area (a3) is printed.

In the document P1 serving as Page 1, the partial character area a1 is disposed at an upper section of the page space in such a manner that the character strings are written in the horizontal direction so as to occupy substantially the whole width of the page space. On the other hand, the partial image area c1 is disposed over substantially the whole area excluding the partial character area a1 and peripheral blank areas of the page space.

Further, in the document P2 serving as Page 2, the partial image area c2 is disposed at a right-lower section of the page space. The sizes of the partial image area c2 are established in such a manner that the vertical length "ch" is equal to or smaller than a half ($\frac{1}{2}$) of the vertical length "nh" of the document P2, while the horizontal length "cw" is equal to or smaller than a half ($\frac{1}{2}$) of the horizontal length "nw" of the document P2. On the other hand, the partial character area a2 is disposed at an upper section and left-side section of the page space, in such a manner that the character strings are written in the horizontal direction so as to occupy substantially the whole width of the page space at the upper section, while, at the left-side section, the character strings are written in the horizontal direction so as to insert a little blank area into the left-lower side section.

Still further, in the document P3 serving as Page 3, the partial character area a3 is disposed over substantially the whole area of the page space, excluding the peripheral blank areas of the page space and a little blank area inserted into the lower section of the page space.

When conducting the copy printing operation of the document by using the copier 10, the user of the copy service inputs setting items in regard to the copy mode (such as a color or monochrome printing mode, a one side or duplex printing mode, a print size, a number of copies, etc.) through the operating display section 16. In addition to the above, the concerned user also inputs an upper limit of copy fee, being payable for the user, and selects either the "image priority case" or the "character priority case". Hereinafter within the descriptions of the first embodiment, it is assumed that the user establishes the color printing mode, the one side printing mode, the A4 print size, a number of copies=1, as the copy mode, and inputs ¥100 as the upper limit of copy fee, and selects the "image priority case". Further, it is also assumed that the copy fee is set at ¥50 per one paper sheet. In this connection, it is also applicable that the establishment of the copy mode is achieved by changing the default setting items. For instance, when the color printing mode, the one side printing mode, the A4 print size, a number of copies=1, are set in advance as the default setting items of the copy mode, the abovementioned setting operation of the copy mode can be omitted. After completing the abovementioned operations, the user makes the scanner section 17 of the copier 10 read the document concerned.

The CPU 11 of the copier 10 calculates an amount of copy charge (required copy fee) in a case that the copy printing operation, based on the image data read from the document by the scanner section 17, is actually implemented in the copy mode established by the user. In the case of the document P shown in FIG. 2, the amount of copy charge can be calculated as ¥50/sheet×3 sheets=¥150. Then, the CPU 11 compares the calculated amount of copy charge with the upper limit of copy fee inputted by the user. When determining that the calculated amount of copy charge is equal to or lower than the upper limit of copy fee (actual amount of copy charge upper limit of copy fee), the CPU 11 implements the copy printing operation of the document P as it is. On the other hand, when determining that the calculated amount of copy charge is higher than the upper limit of copy fee (actual amount of copy charge>upper limit of copy fee), the CPU 11 implements the partially separated image processing.

In the partially separated image processing, the CPU 11 finds a condition for making the actual amount of copy charge being equal to or lower than the upper limit of copy fee by performing the 2 in 1 printing. In this case, it is possible to make the actual amount of copy charge being equal to or lower than the upper limit of copy fee by integrating 2 pages of the document sheets into 1 page so as to reduce the number of printing paper sheets from 3 sheets to 2 sheets. When the condition for the 2 in 1 printing, which makes the actual amount of copy charge being equal to or lower than the upper limit of copy fee, can be found as abovementioned, the CPU 11 searches out pages suitable for the 2 in 1 printing, namely in this case, a pair of continued pages being suitable for the 2 in 1 printing, and then, detects the partial image area(s) and the partial character area(s) included in the pair of pages concerned, to change the sizes of them with variable magnification factors being different form each other, respectively, so as to accommodate and arrange them within the 1 page space.

Figure 3:
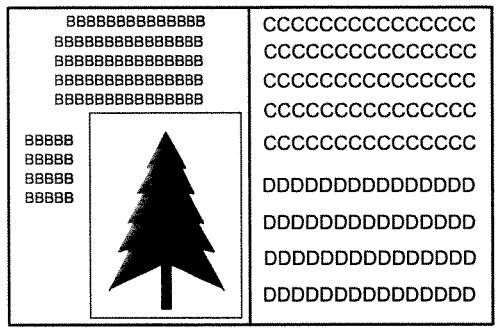
FIG. 3(A) and FIG. 3(B) show schematic diagrams indicating exemplary pages in each of which contents of a second page and a third page, both shown in FIG. 2, are integrated into 1 page space, as an example of the 2 in 1 printing in which a pair of continued pages extracted from 3 pages of a document.
Figure 3:
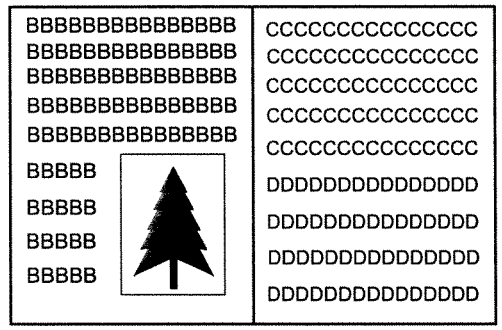

FIG. 3(A) and FIG. 3(B) show schematic diagrams indicating exemplary pages in each of which contents of the second page and the third page are integrated into 1 page space, as an example of the 2 in 1 printing in which the pair of continued pages extracted from 3 pages of the document P. FIG. 3(A) shows the exemplary page when the variable magnification factor of the partial image area is set at 100% (image priority case), while FIG. 3(B) shows the other exemplary page when the variable magnification factor of the partial image area is set at 70% (character priority case).

In the FIRST EMBODIMENT, since the user selects the image priority case, the variable magnification factor of the partial image area is automatically set at 100%. Contrarily, if the user has selected the character priority case, the variable magnification factor of the partial image area would be automatically set at 70%. In this connection, it is also applicable that the variable magnification factor of the partial image area, automatically set as abovementioned, is further changeable (adjustable) to an arbitral value by the user. For instance, in the character priority case, the variable magnification factor of 70%, automatically set in advance for the partial image area, may be further adjusted to another arbitral variable magnification factor, such as 80%, 90%, etc.

Successively, with respect to each of the pages included in the document, the CPU 11 confirms the conditions (1) and (2), indicated as follows, from the first page of the document concerned, to search a pair of continued pages fulfilling the conditions and being suitable for the 2 in 1 printing.

(1) At first, the CPU 11 confirms whether or not the partial image area is surrounded by the characters in at least 3 circumferential directions within the document. This is because, if the partial image area is surrounded by the characters in at least 3 circumferential directions, it becomes difficult to determine the layout of the partial character area(s) when conducting the 2 in 1 printing without changing the size of the partial image area.

(2) When confirming that the partial image area is not surrounded (condition (1) is not fulfilled), the CPU 11 further confirms whether or not at least one of the vertical length and the horizontal length of the partial image area is shorter than a half ($\frac{1}{2}$) of corresponding one of the vertical length and the horizontal length of the document (document paper sheet). This is because, in the 2 in 1 printing, when the document size is equal to the print size, the document image is printed in its half size ($\frac{1}{2}$ as area ratio). Accordingly, with respect to the document in which either the vertical or the horizontal length of the partial image area is equal to or greater than the half ($\frac{1}{2}$) of corresponding one of the vertical length and the horizontal length of the document, the possibility that the partial image area runs off the edge of the printing paper sheet is getting higher, if the 2 in 1 printing operation is implemented without changing the size of the partial image area. Theoretically, provided that the vertical length of the partial image area is shorter than the horizontal length of the document and the horizontal length of the partial image area is shorter than the half ($\frac{1}{2}$) of the vertical length of the document, the partial image area should not run off the edge of the printing paper sheet, even if the 2 in 1 printing operation is implemented without changing the size of the partial image area. However, in this FIRST EMBODIMENT, it is confirmed by employing the abovementioned condition with a margin. Further, the upper limit value (standard value) to be employed for the abovementioned confirming operation varies depending on its variable magnification factor except when the variable magnification factor of the partial image area is set at 100%. For instance, the upper limit value is derived from the Equation indicated as follow, etc.

$$\text{(Upper limit value)}=\text{(Horizontal·Vertical length of document)} \times \tfrac{1}{2} \div \text{(Variable Magnification Factor)}$$

The 2 in 1 printing operation is implemented by employing the pair of continued pages that fulfill the conditions (1) and (2) abovementioned. With respect to the document P, the vertical length and the horizontal length of the partial image area c1 exceed the half ($\frac{1}{2}$) of the vertical length and the half ($\frac{1}{2}$) of the horizontal length of the document, respectively. Therefore, if the 2 in 1 printing operation were implemented by employing the pair of the document P1 of the first page and the document P2 of the second page, the partial image area c1 in which the variable magnification factor is set at 100% (same size) would run off the edge of the printing paper sheet.

Then, the CPU 11 conducts the same confirming operation for the pair of the document P2 of the second page and the document P3 of the third page. Since the pair of the document P2 and the document P3 fulfills the conditions (1) and (2), the CPU 11 determines that the 2 in 1 printing operation is to be implemented by employing the pair of the document P2 and the document P3.

FIG. 4 and FIGS. 5(A) through 5(D) show schematic diagrams illustrating layout procedures for arranging the partial image area and the partial character areas on the page space when the 2 in 1 printing operation is implemented by employing the pair of the document P2 and the document P3. In the FIRST EMBODIMENT, the layout of the partial image area and the partial character areas is achieved by performing the procedure steps of: determining the variable magnification factor of the partial image area corresponding to the result of selecting either the image priority case or the character priority case; arranging the partial image area, the size of which is changed by employing the variable magnification factor determined in the above, into the imaginary area to be used for the 2 in 1 printing and created on the memory, prior to the partial image area; and reducing the size of the partial character area by employing such a variable magnification factor that makes the partial image area fit within the residual area of the page space. Further, the size of the partial character area is made to be as large as possible, while fitting it with the size of the residual area.

Figure 4:
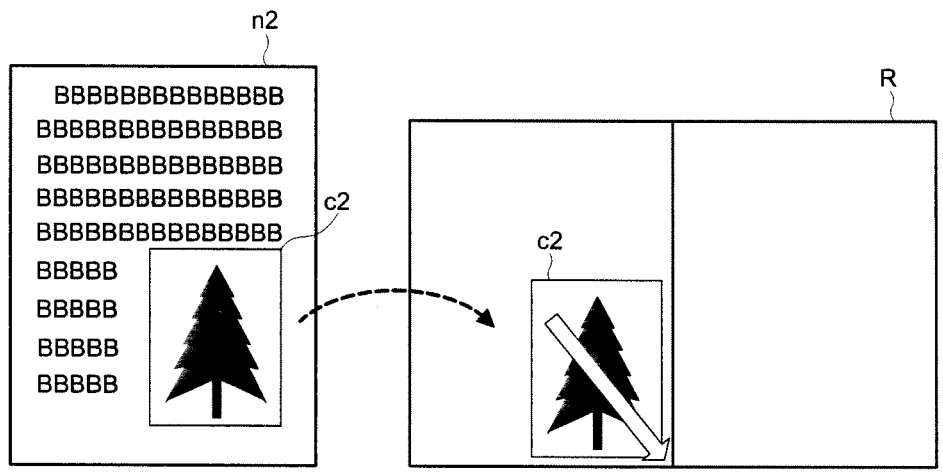
FIG. 4 shows a schematic diagram illustrating layout procedures for arranging a partial image area when a 2 in 1 printing operation is implemented by employing a pair of the second page and the third page shown in FIG. 2.

Concretely speaking, as shown in FIG. 4, the CPU 11 creates an imaginary area R to be used for the 2 in 1 printing operation on the memory. Since the print size is set at A4 size in the FIRST EMBODIMENT, the size of the imaginary area R is also set at A4 size. Further, since the image priority case is selected, the CPU 11 fits the partial image area c2 of the document P2 within the left-half page area of the imaginary area R without changing the size of the partial image area c2 (variable magnification factor: 100%), and then, moves the partial image area c2 toward the corner of the left-half page area at which the partial image area c2 is not surrounded by the characters. Successively, the CPU 11 divides the partial character area a2 into plural character blocks within each of which plural characters are successively continued, so as to determine layout positions of the plural character blocks, each of which should be located in the residual area other the partial image area c2 within the imaginary area R, one by one in order, the leading one first, and then, arranges them into the imaginary area R after conducting the size adjusting operation.

Figure 5:
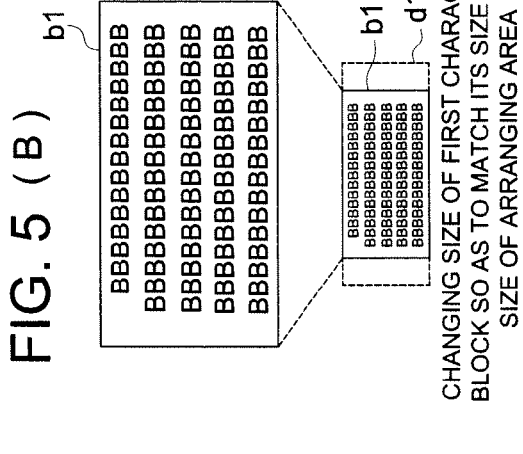
FIG. 5(A), FIG. 5(B), FIG. 5(C) and FIG. 5(D) show schematic diagrams illustrating layout procedures for arranging a partial image area and partial character areas in a unit of character block on a page space when a 2 in 1 printing operation is implemented by employing a pair of the second page and the third page shown in FIG. 2.
Figure 5:
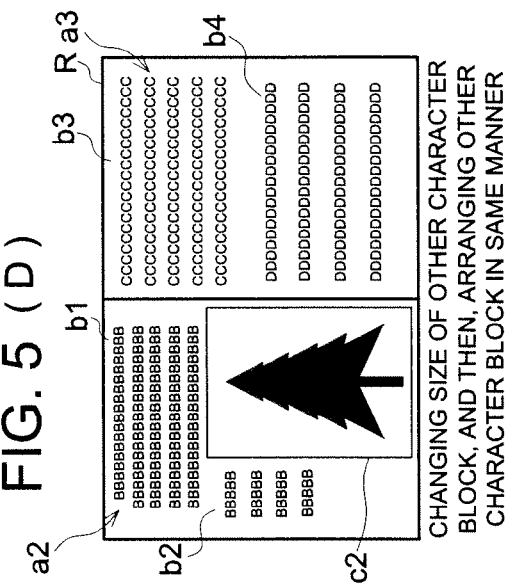
Figure 5:
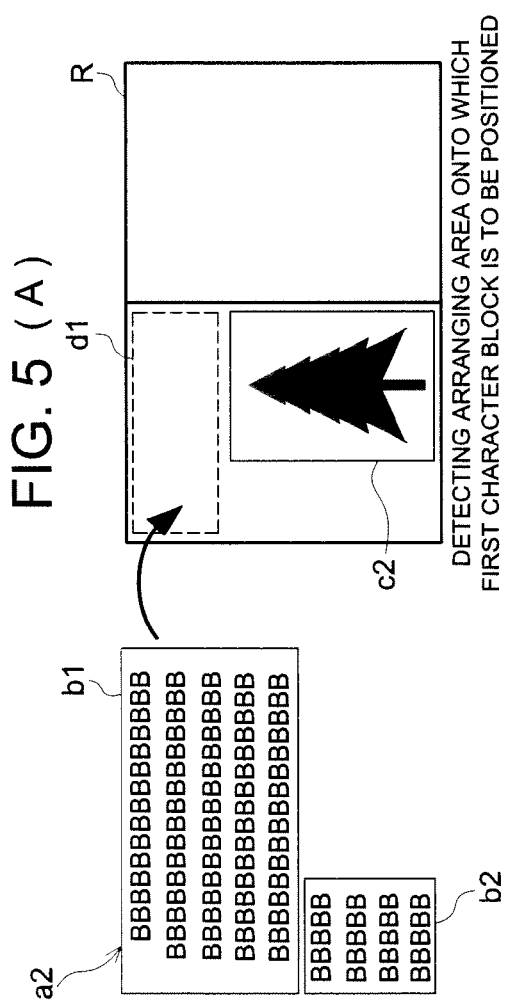
Figure 5:
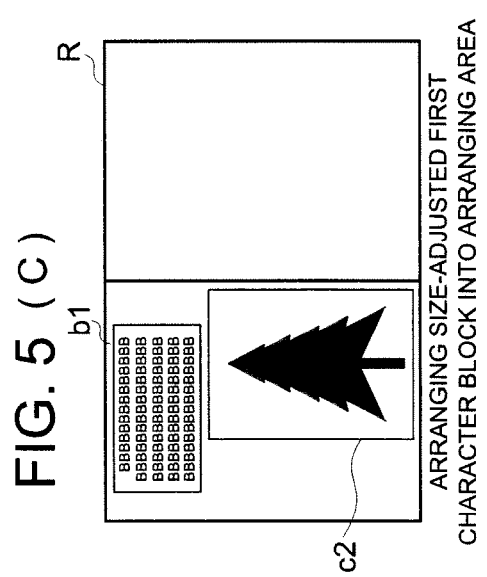

As shown in FIG. 5(A), the CPU 11 detects an arranging area d1, onto which a first character block b1 divided from the partial character area a2 is positioned, within the imaginary area R. In the FIRST EMBODIMENT, the arranging area d1 is located at the upper area of the partial image area c2 in the left-half page area on which the partial image area c2 is arranged.

As shown in FIG. 5(B), determining the arranging area d1, the CPU 11 further determines the variable magnification factor to be applied for the first character block b1, so as to match its size with the size of the arranging area d1, and then, conducts the size adjustment operation by changing the size of the first character block b1 with using the variable magnification factor determined in the above. At this occasion, the CPU 11 compares the magnification factor (reduction factor), acquired by dividing the horizontal length of the arranging area d1 by the other horizontal length of the first character block b1, with the other magnification factor (reduction factor), acquired by dividing the vertical length of the arranging area d1 by the other vertical length of the first character block b1, so as to determine the smaller one as the variable magnification factor of the first character block b1. Further, the variable magnification factors of the first character block b1 in both horizontal and vertical directions are set at the same value.

Successively as shown in FIG. 5(C), the CPU 11 arranges the size-adjusted first character block b1 into the arranging area d1 so as to accommodate it within the arranging area d1. As a result, the first character block b1 is arranged into the arranging area d1 as the maximized size for it, and the blank areas generated around the peripheral of the first character block b1 after arranging the first character block b1 can be minimized. Further, considering a page appearance, etc., it is desirable that the actual position of the first character block b1 is adjusted corresponding to the direction in which the blank areas are generated. For instance, when the blank areas are generated in the horizontal direction as shown in FIG. 5(C), it is desirable that the position of the first character block b1 is adjusted at the center of the arranging area d1 in its horizontal direction, so as to generate the blank areas having an equivalent size on left and right sides of the first character block b1, respectively. Further, when the blank areas are generated in the vertical direction, it is desirable that the position of the first character block b1 is shifted to the upper side of the arranging area d1 in its vertical direction, so as to generate the blank area only at the lower side of the first character block b1, etc.

Still successively, as shown in FIG. 5(D), with respect to a second character block b2 divided from the partial character area a2 of the document P2, the CPU 11 also conducts the same procedure steps as abovementioned, including the detection of the arranging area in the left-half page area, the size adjustment fitted with the arranging area concerned, and the arrangement into the arranging area concerned. In this FIRST EMBODIMENT, the size of the second character block b2 is adjusted at such a maximum size that can be accommodated within the left side area of the partial image area c2 in the left-half page area in which the partial image area c2 is arranged, so as to dispose the second character block b2 therein.

Still successively, with respect to the partial character area a3 of the document P3, the CPU 11 also conducts the operation for dividing the partial character area a3 in a unit of the block, and with respect to the third character block b3 and the forth character block b4, conducts the equivalent procedure steps as abovementioned, including the detection of the arranging area in the right-half page area within the imaginary area R, the size adjustment fitted with the arranging area concerned, and the arrangement into the arranging area concerned. In this FIRST EMBODIMENT, the size of the third character block b3, located at the upper side of the partial character area a3, is adjusted at such a maximum size that can be accommodated within the upper side area of the partial image area c3 in the right-half page area, so as to dispose the second character block b3 therein. Further, the size of the fourth character block b4, located at the lower side of the partial character area a3, is adjusted at such a maximum size that can be accommodated within the lower side area of the partial image area c3 in the right-half page area, so as to dispose the fourth character block b4 therein.

Finalizing the layout processing for arranging the partial image area and the partial character area into the imaginary area R by implementing the partially separated image processing abovementioned, the CPU 11 proposes a print preview and a print fee (amount of charged fee) to the user. When the user inputs an approval for the proposed contents, the CPU 11 conducts the print outputting operation for outputting the printout having the contents being same as those of the print preview screen, while, the user inputs a disapproval for the proposed contents, the CPU 11 conducts a re-layout operation for again arranging the partial character areas into the imaginary area R.

Figure 6:
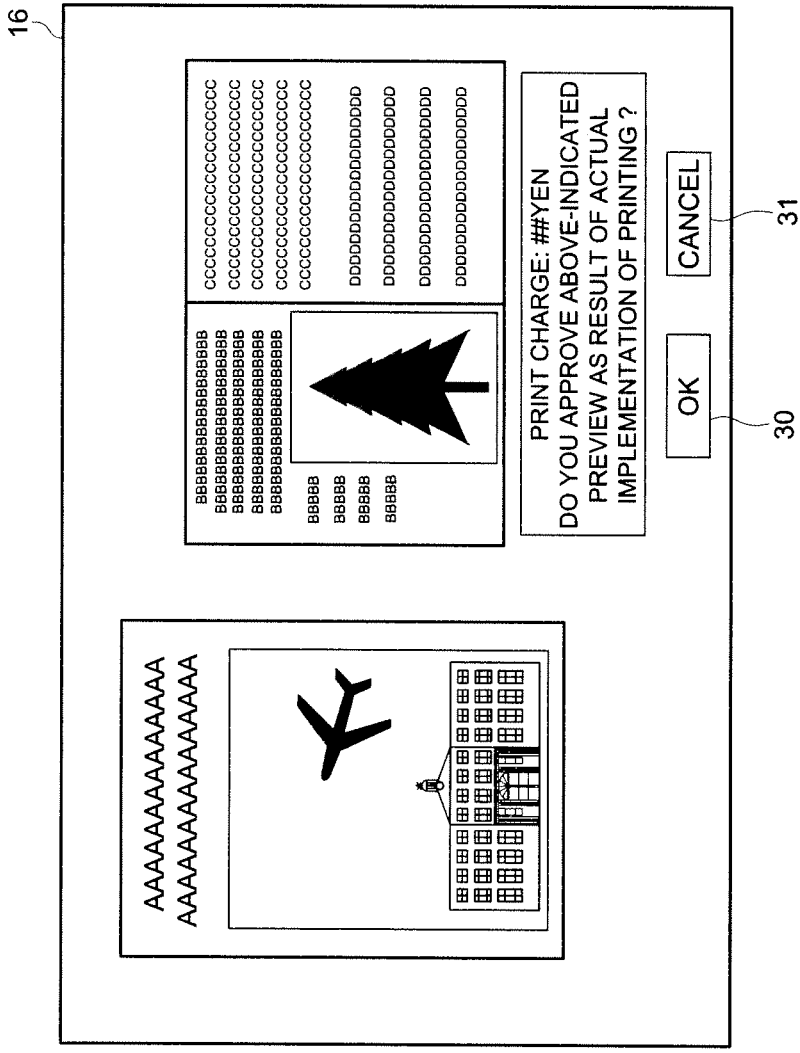
FIG. 6 shows an exemplary screen, which is displayed on an operating display section and on which a print preview of a document and a print fee to be proposed to the user are displayed.

FIG. 6 shows an exemplary screen, which is displayed on the operating display section 16 after the partially separated image processing abovementioned has been completed, and on which the print preview of the document P and the print fee to be proposed to the user are displayed. When the user depresses an implementation button 30, the CPU 11 implements the print outputting operation for outputting the printout having the contents being same as those of the print preview screen. On the other hand, when the user depresses a cancel button 31, the CPU 11 conducts the re-layout operation for again arranging the partial character areas in a unit of character, detailed in the following, without implementing the print outputting operation.

In the re-layout operation in a unit of character, the partial character area is divided into characters in a unit of character, and at the same time, based on the arrangeable area for the partial character area (residual area) and a number of characters included therein, the CPU 11 determines a variable magnification factor that makes it possible to maximize each size of the characters and to accommodate it within the residual area, and then, changes the size of each of the characters by employing the variable magnification factor determined in the above, so as to achieve the re-layout operation of the partial character area. Further, the blank areas residing in the original document are utilized for rearranging the partial character areas without conducting the re-layout operation for the blank areas abovementioned, so as to make the variable magnification factor of the character as large as possible.

At first, the CPU 11 once clears the partial character area a2 and the partial character area a3, which had been arranged in a unit of the block, to calculate the residual area derived by excluding the partial image area c2 from the imaginary area R. In this connection, it is applicable that the above residual area is defined as a part of the imaginary area, derived by excluding the partial image area and the peripheral blank areas from the imaginary area R.

When a blank area, other than the partial image area and the partial character area, exists in the original document, sometimes, the blank area would be included in the residual area. As aforementioned, the variable power processing is applied to the partial image area so as to arrange the size-changed partial image area into the imaginary area, prior to the partial character area. Accordingly, if some amount of residual part of the blank area still remains without being eroded by the size-changed partial image area arranged into the imaginary area, the residual part of the blank area is included in the residual area.

For instance, as shown in FIG. 2, the blank areas exist within the both document areas of the document P2 and the document P3, both of which are to be processed in the 2 in 1 printing. In the abovementioned blank areas, there still remains some amount of the residual part without being eroded by the size-changed partial image area c2 arranged into the imaginary area R. Accordingly, the residual area in the imaginary area R includes the residual part of the blank areas abovementioned.

Successively, the CPU 11 divides the partial character area a2 and the partial character area a3, newly read from the document P2 and the document P3, into character images in a unit of character, and calculates an arrangement area per one character image, by dividing the residual area by the total number of characters included in the partial character area a2 and the partial character area a3. Matching with the above-calculated arrangement area, the CPU 11 determines the variable magnification factor of the character image, so as to conduct the size adjustment operation for changing a size of each of the character images by employing the variable magnification factor determined in the above. In this operation, the variable magnification factors of the character image in both the vertical direction and the horizontal direction are made to be same as each other. Then, the CPU 11 sequentially embeds the size-adjusted character images one by one into the corresponding arrangement areas in order of the character images, leading one first, so as to rearrange the partial character area a2 and the partial character area a3 into the re-layout pattern.

Figure 7:
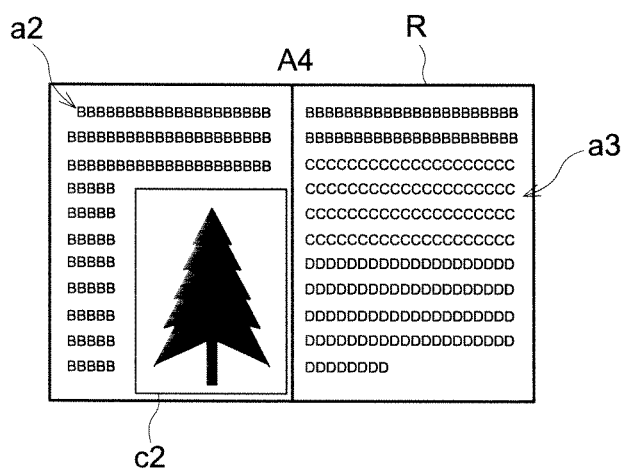
FIG. 7 shows an explanatory schematic diagram illustrating a state that characters (size-adjusted character images), included in partial character areas, are arranged into a residual area of an imaginary area, when a 2 in 1 printing operation is implemented with respect to a pair of the second page and the third page shown in FIG. 2.

FIG. 7 shows a schematic diagram illustrating a state that the characters (size-adjusted character images), included in the partial character area a2 and the partial character area a3, are embedded and arranged into the residual area of the imaginary area R, as the result of the re-layout operation abovementioned. In this re-layout operation in a unit of character, each of the characters is adjusted to the same maximum size before arranging them into the residual area of the imaginary area R, so that all of the characters can be accommodated within the residual area concerned. Further, as being recognized by comparing the schematic diagram shown in FIG. 7 with that shown in FIG. 2, some characters are arranged into the blank areas residing in the partial character area a2 and the partial character area a3, serving as the original document. According to this re-layout operation in a unit of character, since the size adjustment operation (size maximization operation) of the characters is conducted by including all of such the blank areas into the residual area to be employed, it becomes possible to easily enlarge each size of the characters. In this FIRST EMBODIMENT, as being recognized by comparing the schematic diagram shown in FIG. 7 with that, illustrating the layout in a unit of the block, shown in FIG. 5(D), the size of each of the characters is enlarged, compared to those shown in FIG. 5(D).

As described in the foregoing, according to the re-layout operation for the imaginary area R in a unit of character, since the blank areas of the original document are also effectively utilized, an amount of the blank areas affects the size of the characters to be arranged into the imaginary area R. For instance, when a large blank area exists in the original document, it may be possibly occur that the variable magnification factor of the character becomes greater than the reduction factor of the document image (50% in case of the 2 in 1 printing), or exceeds 100%. When the variable magnification factor of the character exceeds 100%, the character size to be employed in the 2 in 1 printing is greater than that employed in the original document.

Further, when some characters cannot be accommodated within the corresponding half page area in the imaginary area R as arranged in the original document, the concerned some characters are sifted into the adjacent half page area so as to arrange them therein. In this FIRST EMBODIMENT, as shown in FIG. 7, in the partial character area a2 of the document P2, the characters that cannot be accommodated within the left-side half page area of the imaginary area R are sifted into the right-side half page area so as to arrange them therein.

Finalizing the re-layout processing for rearranging the Partial character area abovementioned into the imaginary area R, the CPU 11 again proposes its print preview and the print fee to the user. When the user inputs the approval for the above-proposed contents, the CPU 11 conducts the print outputting operation for outputting the printout having the contents being same as those of the print preview screen.

Next, the operations to be conducted by the copier 10 will be detailed in the following.

Figure 8:
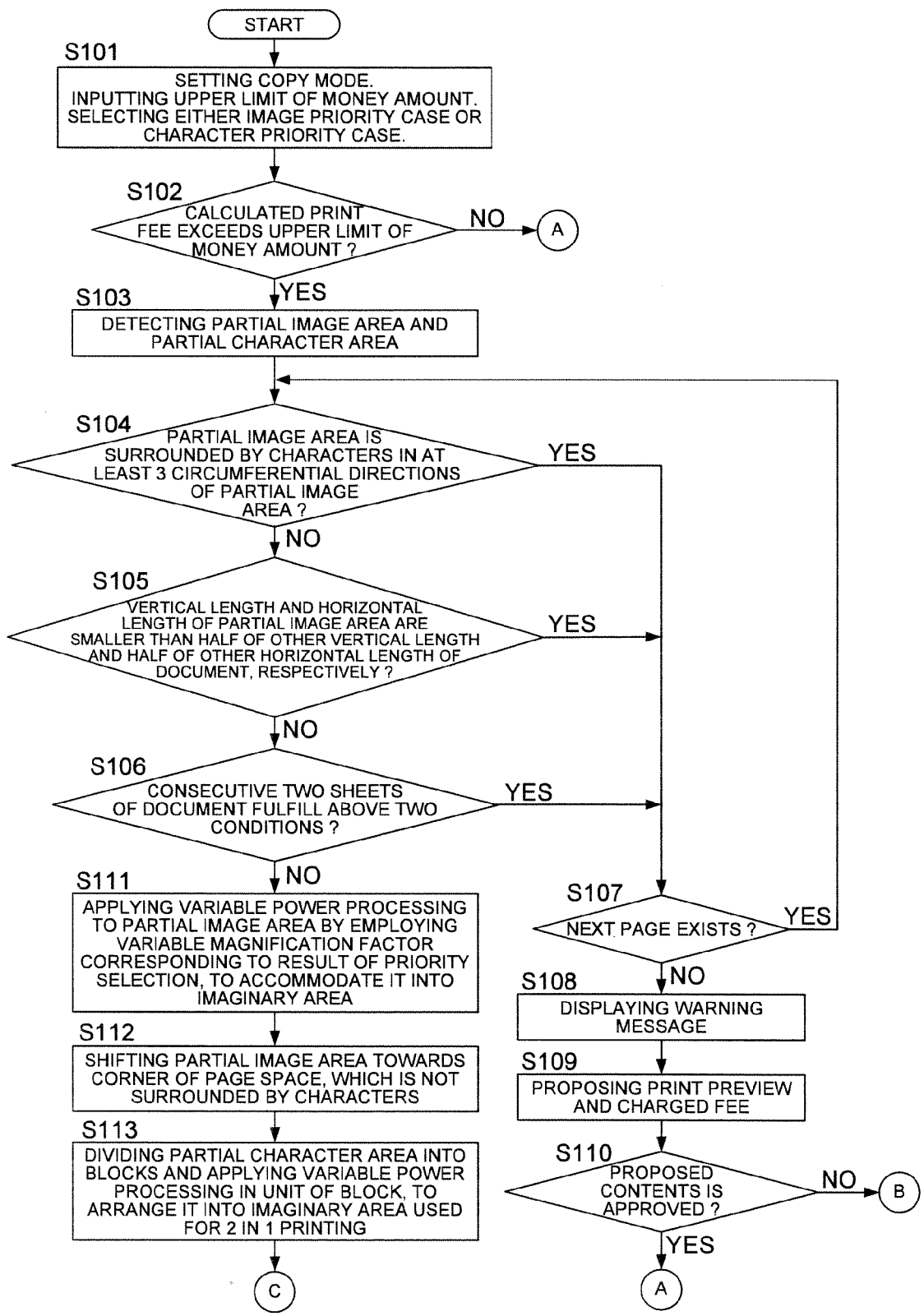
FIG. 8 shows a flowchart indicating a consecutive flow of copy processing to be conducted by a copier embodied in the present invention.
Figure 9:
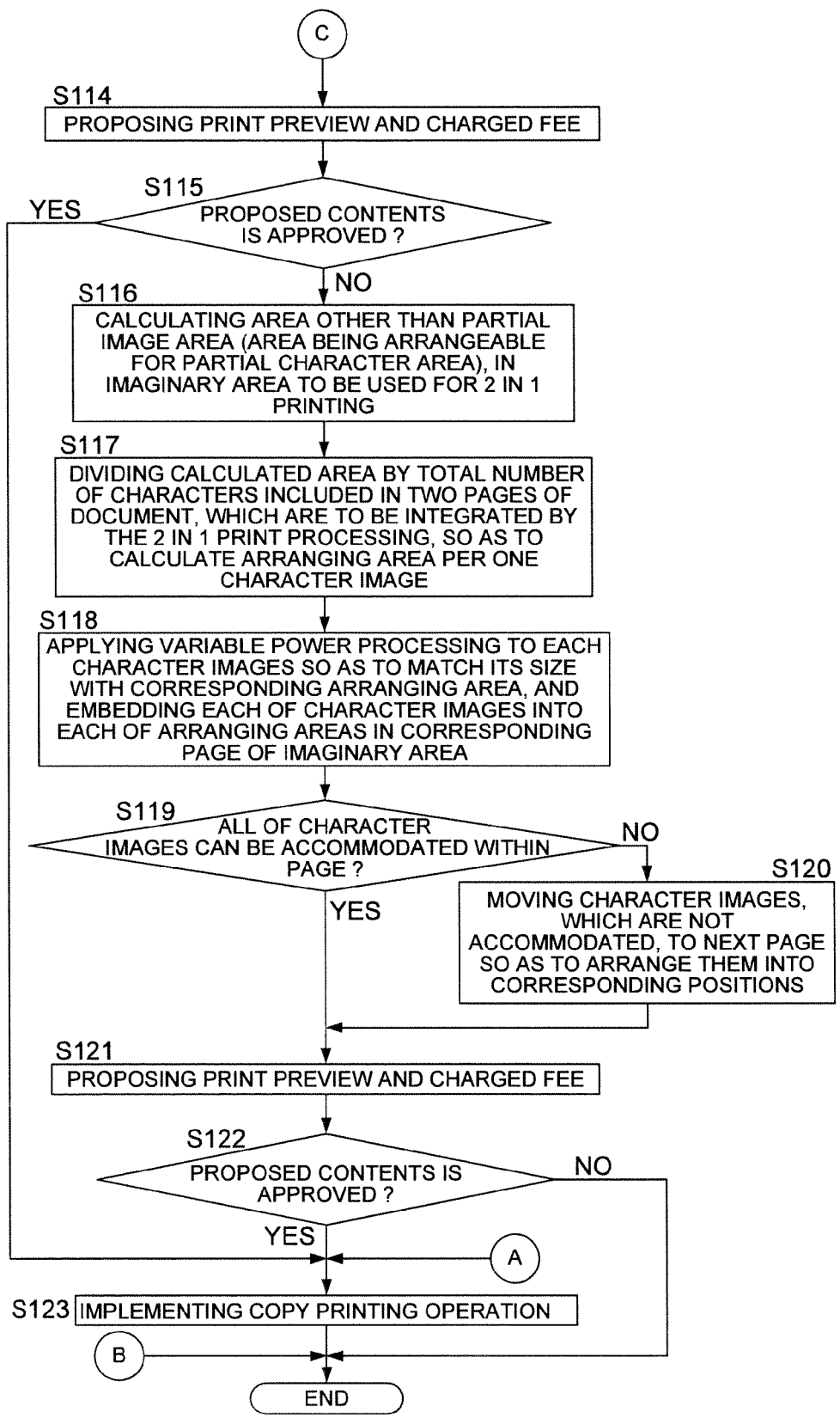
FIG. 9 shows a flowchart indicating a consecutive flow of copy processing to be conducted by a copier embodied in the present invention.

FIG. 8 and FIG. 9 show flowcharts indicating a consecutive flow of copy processing to be conducted by the copier 10. When the copier 10 is activated, the CPU 11 starts the copy processing (START). The CPU 11 accepts the setting items in regard to the copy mode, the upper limit of money amount, and the selection in regard to either the image priority case or the character priority case, inputted by the user of the copy service through the operating display section 16 (Step S101). After that, the CPU 11 calculates an actual amount of money (print fee) to be charged when the copy printing operation is actually implemented on the basis of the image data read from the original document by the scanner section 17, so as to determine whether or not the calculated print fee exceeds the upper limit of money amount inputted by the user concerned (Step S102).

Successively, when determining that the calculated print fee does not exceed the upper limit of money amount (Step S102; No), the CPU 11 implements the copy printing operation based on the image data read from the original document (Step S123), and conducts the print fee processing for the copy printing operation implemented in the above, and after that, finalizes the copy processing (END). On the other hand, when determining that the calculated print fee exceeds the upper limit of money amount (Step S102; Yes), the CPU 11 implements the partially separated image processing aforementioned.

At first, the CPU 11 detects the partial image areas and the partial character areas (Step S103), both included in the document image, and then, confirms whether or not the partial image area, residing in each of predetermined pages (initially, the first page and the second page), is surrounded by the characters in at least 3 circumferential directions of the partial image area concerned (Step S104).

When confirming that the partial image area is surrounded (Step S104; Yes), the CPU 11 shifts the processing to Step S107. When confirming that the partial image area is not surrounded (Step S104; Yes), the CPU 11 further confirms whether or not the vertical length and the horizontal length of the partial image area are smaller than a half (½) of the other vertical length and a half (½) of the other horizontal length of the document, respectively (Step S105).

When confirming that at least one of the vertical length and the horizontal length of the partial image area is equal to or greater than at least corresponding one of a half (½) of the other vertical length and a half (½) of the other horizontal length of the document (Step S105; Yes), the CPU 11 shifts the processing to Step S107. When confirming that the vertical length and the horizontal length of the partial image area are smaller than a half (½) of the other vertical length and a half (½) of the other horizontal length of the document, respectively, the CPU 11 still further confirms whether or not the consecutive two sheets of the document (initially, the first page and the second page) fulfill the aforementioned two conditions (Step S104, Step S105 and Step S106).

When determining that the consecutive two sheets do not fulfill the aforementioned two conditions, the CPU 11 shifts the processing to Step S107. When determining that the consecutive two sheets fulfill the aforementioned two conditions, the CPU 11 shifts the processing to Step S111.

Still successively, in Step S107, the CPU 11 confirms whether or not a next page, positioned next to the predetermined pages confirmed in the abovementioned steps, exists. When determining that the next page exists, the CPU 11 returns the processing to Step S104, so as to applies the confirming processing in Step S104 and later steps to the next page, as well. When determining that the next page does not exist, the CPU 11 makes the operating display section 16 display such a warning message that indicates "The required copy printing cannot be implemented due to a shortage of the inputted upper limit of money amount." on the screen thereof (Step S108), and proposes the print preview and the charged fee (Step S109).

When receiving the operation for approving the proposed contents (depression of the implementation button 30) (Step S110; Yes), the CPU 11 implements the copy printing operation concerned (Step S123), and conducts the print fee processing for the copy printing operation implemented in the above, and after that, finalizes the copy processing (END). On the other hand, when receiving the operation for disapproving the proposed contents (depression of the cancel button 31) (Step S110; No), the CPU 11 finalizes the copy processing without implementing the copy printing operation concerned (END).

On the other hand, in Step S111, the CPU 11 applies the variable power processing to the partial image area by employing the variable magnification factor corresponding to the result of selecting either the image priority case or the character priority case, so as to accommodate the size-changed partial image area into the imaginary area R to be used for the 2 in 1 printing, created on the memory (refer to FIG. 4). Concretely speaking, when the image priority case is selected, the partial image area is accommodated into the corresponding page area (half page) of the imaginary area as it is, without changing its size (the variable magnification factor; 100%). While, when the character priority case is selected, the reduction variable power processing is applied to the partial image area by employing the variable magnification factor of 70%, so as to accommodate the size-reduced partial image area into the corresponding page area (half page) of the imaginary area.

Successively, the CPU 11 shifts the partial image area towards the corner of the page space, which is not surrounded by the characters (Step S112). Further, the CPU 11 divides the partial character area into character blocks for every range in which plural characters are successively continued, and then, applies the variable power processing to each of the character blocks divided in advance so as to arrange the processed (size-changed) character blocks within the area (residual area), other than the partial image area, in the imaginary area to be used for the 2 in 1 printing (Step S113). At this time, the CPU 11 makes the operating display section 16 display the print preview and the amount of charged fee thereon, so as to propose them to the user concerned (Step S114).

Receiving the operation for approving the contents proposed to the user (depression of the implementation button 30) (Step S115; Yes), the CPU 11 implements the copy printing operation concerned (Step S123), and conducts the print fee processing for the copy printing operation implemented in the above, and after that, finalizes the copy processing (END). On the other hand, when receiving the operation for disapproving the proposed contents (depression of the cancel button 31) (Step S115; No), the CPU 11 divides the partial character area into character images for every character, in order to apply the re-layout processing to the partial character area.

Still successively, the CPU 11 calculates the area (residual area), other than the partial image area, in the imaginary area to be used for the 2 in 1 printing, namely, the area being arrangeable for the partial character area (Step S116). Further, the CPU 11 divides the calculated area by the total number of characters included in the concerned two pages of the document, which are to be integrated by the 2 in 1 print processing, so as to calculate an arranging area per one character image (Step S117). Then, the CPU 11 applies the variable power processing to each of the character images so as to match its size with the arranging area per one character image, and embeds each of the character images into each of the arranging areas in the corresponding page of the imaginary area (Step S118).

When all of the character images can be accommodated into the page concerned (Step S119; Yes), the CPU 11 shifts the processing to Step S121. On the other hand, when some character images cannot be accommodated into the page concerned (Step S119; No), the CPU 11 moves the concerned character images to the next page so as to arrange them into the corresponding positions therein (Step S120), and then, shifts the processing to Step S121.

In Step S121, the CPU 11 proposes the print preview in which the partial character area is rearranged by performing the re-layout processing and the revised charge fee. When receiving the operation for approving the proposed contents (depression of the implementation button 30) (Step S121; Yes), the CPU 11 implements the copy printing operation concerned (Step S123), and conducts the print fee processing for the copy printing operation implemented in the above, and after that, finalizes the copy processing (END). On the other hand, when receiving the operation for disapproving the proposed contents (depression of the cancel button 31) (Step S121; No), the CPU 11 finalizes the copy processing without implementing the copy printing operation concerned (END).

As described in the foregoing, the copier 10, embodied in the present invention, performs such the image processing (partially separated image processing) that the CPU 11, serving as the control section, detects the partial image area and the partial character area, which are included in two pages of the document to be processed in the 2 in 1 print processing, and then, changes the sizes of the partial image area and the partial character area with the variable magnification factors being different from each other, respectively, so as to accommodate and arrange them within the imaginary area being equivalent to one page area. Concretely speaking, the size of the partial image area is changed by employing a variable magnification factor (100% or 70%), being greater than the reduction factor (50%) to be employed for the document image, so as to arrange the size-changed partial image area into the imaginary area, prior to the partial character area. Then, the CPU 11 changes the size of the partial character area, so as to accommodate and arrange the size-changed partial character area within the residual area, other than the partial image area arranged in advance. According to the partially separated image processing performed in the above, it becomes possible to prevent the size-reduced partial image area, the size of which is reduced from that of the original document in the 2 in 1 printing operation, from deterioration of the perceptibility thereof. Specifically in the FIRST EMBODIMENT, when the image priority case is selected, the CPU 11 sets the variable magnification factor of the partial image area at 100% so as to maintain its size as it is. Accordingly, since the original size of the partial image area is not reduced, but is kept constant as it is in the 2 in 1 integrated image area, even if the original size of the document image is reduced as a whole, and therefore, the deterioration of the perceptibility in the partial image area, caused by the size reduction, does not occur. In addition, since the sizes of the partial image area and the partial character area are changed by employing suitable variable magnification factors being equal to or different from each other, respectively, so as to accommodate them within the imaginary area and to arrange them at suitable positions, it becomes possible to make the maneuverability of the copier 10 easy. Further, since the user can selects either the image priority case or the character priority case, it becomes possible to improve its convenience for the user.

Further, according to the FIRST EMBODIMENT, by changing the size of the partial image area with the predetermined variable magnification factor so as to arrange the size-changed partial image area into the imaginary area, prior to the partial character area, the residual area in the imaginary area, in which the partial character area is to be arranged, can be determined. Accordingly, it becomes possible to change the size of the partial character area and arrange the size-changed partial character area so that it is accommodated within the residual area abovementioned. Therefore, the aforementioned image processing can be performed by employing such the simple algorism as abovementioned.

Still further, in the layout operation for the partial character area, the partial character area is divided into either the character blocks or the character images in a unit of either block or character, and then, a size of each of them is changed by employing a suitable variable magnification factor, so as to accommodate them within the residual area of the imaginary area and to arrange them at suitable positions. In other words, the partial character area, the shape of which is liable to become complicated, is divided into plural sections so as to heighten the arrangement flexibility of them, and further, the size and position of each of the divided sections are adjusted at the time when arranging each of them. By handling the partial character area in a state of divided sections as abovementioned, it becomes possible to easily accommodate it within the residual area remaining inside the imaginary area and to easily make its size larger, compared to the case in which the shape of the partial character area is maintained as it is. Further, when the partial character area is divided into plural character blocks in a unit of the block, since the layout of each of the characters included in the partial character area is maintained for every block, it becomes possible to suppress the deterioration of its appearance. Still further, when the partial character area is divided into plural character images in a unit of the character, since the partial character area can be divided into plural sections being finer than those divided in a unit of the block, it becomes possible to heighten not only the arrangement flexibility of them, but also the layout-capability and the versatility of the partial character area, and further, it also becomes possible to cope with the partial character area having a highly complicated shape or the like, more flexibly than ever.

Further, in the charged copy service, the aforementioned image processing including the 2 in 1 print processing is implemented in the case that the amount of charged fee, which is to be charged when the copy printing operation based on the image data read from the document is implemented according to the copy mode established by the user, is greater than the upper limit value of charged fee inputted by the user. According to the FIRST EMBODIMENT of the present invention, only by conducting simple operations, it becomes possible for the user to eliminate such the deterioration of the perceptibility in regard to the document image to be processed in the 2 in 1 print processing due to the abovementioned shortage of the money amount. Still further, even in such a case that the aforementioned image processing including the 2 in 1 print processing is implemented so as to suppress the toner consumption when the residual amount of toner has become short, it becomes possible for the user to eliminate the deterioration of the perceptibility in regard to the document image to be processed in the 2 in 1 print processing, only by conducting simple operations.

Although the FIRST EMBODIMENT of the present invention has been described in the foregoing, the scope of the present invention is not limited to the FIRST EMBODIMENT. Modifications and/or additions made by a skilled person without departing from the spirit and scope of the invention shall be included in the scope of the present invention.

For instance, the method for reducing the size of the image (document image) is not limited to the aforementioned reduction method (reduction variable power processing) to be implemented in the 2 in 1 printing describe in the FIRST EMBODIMENT. Other than the reduction variable power processing, various kinds of methods, such as a method for reducing the size of the image by employing an independent variable power function in which the vertical length and the horizontal length of the image concerned can be separately changed by employing the variable magnification factors being independent from each other, another method for reducing the size of the image by changing a vertical/horizontal ratio such as changing the B4 size to the legal size or the letter size or the like, still another method for reducing the size of the image by changing a shape of the image such as changing a rectangular image to a square or elliptical image being smaller than the original rectangular image or the like, etc., can be employed for this purpose.

Still further, the purpose of reducing the size of the image is not limited to the use of the 2 in 1 printing described in the FIRST EMBODIMENT. It is also applicable that the reduction variable power processing or the like is applied to another kind of integration printing, such as the 4 in 1 printing, etc., or the usage of the various kinds of variable power functions in which the user designates the variable magnification factor and/or the fixed size to conduct the variable power processing. In this connection, it is also applicable that, when applied to the variable power functions abovementioned, as described in the FIRST EMBODIMENT, the variable magnification factor of the partial image area or the partial character area is automatically determined corresponding to the result of selecting either the image priority case or the character priority case.

Still further, although the image processing (partially separated image processing) is implemented only when the amount of fee to be charged for the actual use of the copy printing service exceeds the upper limit value of charged fee desired by the user in the above-described FIRST EMBODIMENT, the scope of the condition for implementing the image processing is not limited to the above. For instance, it is also applicable that the image processing is implemented when the user voluntary uses the integration printing function, or the variable power function abovementioned, etc. in this case, as described in the FIRST EMBODIMENT, it is also applicable that the variable magnification factor of the partial image area or the partial character area is automatically determined corresponding to the result of selecting either the image priority case or the character priority case, as well.

Still further, in the FIRST EMBODIMENT, the size of the partial image area is changed first by employing the predetermined variable magnification factor, so as to arrange it into the imaginary area prior to the partial character area, and then, the variable power processing is applied to the partial character area so as to accommodate it into the residual area remaining in the imaginary area, and further, the variable magnification factor for the partial image area is set at 100%. Conversely, it is also applicable, however, that the size of the partial character area is changed first by employing a predetermined variable magnification factor, and then, the size of the partial image area is changed by employing a variable magnification factor corresponding to that for the partial character area, and/or the variable magnification factor for the partial character area is made to be higher than that for the partial image area, and/or the variable magnification factor for the partial character area is set at 100%. As mentioned in the FIRST EMBODIMENT, it is also applicable that, as far as the copier 10 is configured to accept the selection of either the image priority case or the character priority case, for instance, the variable magnification factor for the partial character area is set at 100% when the character priority case is selected, or the variable magnification factor for the partial character area is set at 70% when the image priority case is selected, etc. In this case, it becomes possible to prevent the partial character area from the deterioration of the perceptibility.

Still further, in the case that the size of the partial character area is changed first by employing a predetermined variable magnification factor, and then, the size of the partial image area is changed by employing a variable magnification factor corresponding to that for the partial character area, the processing procedures indicated as follows are applicable. For instance, the variable magnification factor for the partial character area is determined corresponding to the result of selecting either the image priority case or the character priority case, so as to find a character arranging area necessary for the case that the size of the partial character area is changed by employing the above-determined variable magnification factor to arrange the partial character area into the imaginary area. Then, the residual area, namely, an arranging area for the partial image area (an image arranging area), is derived by subtracting the character arranging area from the imaginary area. Successively, a variable magnification factor of the partial image area, which makes the image arranging area while maintaining the vertical/horizontal ratio of the partial image area, is found. Then, the partial image area is arranged at an arbitral position within the imaginary area (in the case of the 2 in 1 printing, an arbitral position within a half page area concerned), and the partial character area is arranged into an area other than the partial image area. In this case, it is also applicable that the partial character area is divided into plural blocks or plural characters in a unit of block or character so as to arrange them into the corresponding areas, as well. Further, when the partial image area is large, it is applicable that a kind of regulation is applied to the abovementioned arranging operation. For instance, the regulation is such that the area occupied by the size-reduced partial character area acquired by applying the size reduction processing does not become equal to or smaller than ⅓ of the other area occupied by the original partial character area, etc.

Second Embodiment

Next, referring to FIG. 10 through FIG. 15, the SECOND EMBODIMENT of the present invention will be detailed in the following.

By executing corresponding one of the programs, the CPU 11 compares an amount of copy charge, to be charged at the time when the copy printing operation established from the operating display section 16 is implemented, and the upper limit of money amount, inputted by the user, with each other. When the amount of copy charge is greater than the upper limit of money amount as a result of the above comparison, the CPU 11 conduct a predetermined image processing so as to create a print preview that suppress the amount of copy charge to a level equal to or lower than the upper limit of money amount, and to make the operating display section 16 display the print preview thereon. In the abovementioned operation for creating and displaying the print preview, the CPU 11 detects the attributes of each of the pages included in the document image represented by the image data acquired by the scanner section 17, and based on the detected attributes, selects specific pages suitable for applying a predetermined image processing from the pages included in the document image, so as to apply the predetermined image processing to the selected pages concerned. In addition, the CPU 11 also serves as a detecting section not only for detecting the partial character area and the partial image area included in each of the pages included of the document, but also for detecting the attributes of each of them. Further, the CPU 11 conducts the abovementioned detecting operation by employing the general purpose algorism for analyzing contents of the image data so as to discriminate data of the partial character area and other data of the partial image area from each other, etc. In this connection, the partial image area represents a schematic diagram (such as a graph, a drawing, a picture, etc.), a photographic image, etc.

Concretely speaking, hereinafter, the predetermined image processing is defined as any one of: the integration processing (N in 1 print processing) in the integration printing function, a duplex print processing in the duplex printing function, a print density lowering processing in the toner saving function, etc., wherein the copier 10 is provided with those functions as the printing function. The integration processing to be employed in the SECOND EMBODIMENT includes the 2 in 1 print processing, the 4 in 1 print processing and the 8 in 1 print processing.

When the predetermined image processing is applied so as to reduce the amount of copy fee to be charged to the copy printing operation, the reduction of the copy fee is achieved by reducing the number of printed paper sheets in the integration processing or the duplex print processing, or by suppressing (saving) the toner consumption amount by lowering the print density in the print density lowering processing. In this connection, it is desirable that an appropriate system for charging the copy fee, complying with the current amount of toner consumption, in the toner saving function.

Further, it is also applicable that the predetermined image processing is performed at the time when the residual amount of toner, detected by the toner residual amount detecting section 22 of the printer section 19, is lower than a predetermined lower limit. In this connection, for instance, the suppression of the toner consumption amount is achieved by the reduction of the number of printed paper sheets in the integration processing or the duplex print processing, or by suppressing (saving) the toner consumption amount by lowering the print density in the print density lowering processing. Further, hereinafter, the predetermined image processing mentioned in the above is also referred to as the "image change processing".

The term of "attributes" is to be used for determining the page, which is suitable for the image change processing abovementioned, and includes such attributes that belong to the image itself described in each of the pages, namely, the attributes of the contents of description (description information) themselves. Concretely speaking, the abovementioned attributes includes attributes of the partial character area and/or attributes of the partial image area, residing in the page concerned. Further, the attributes of the partial character area represent a size of characters (Font Size), a color, a density, etc. Still further, the other attributes of the partial image area represent a kind of image (such as, a schematic diagram, a photographic image, etc.), a size, a color, a density, etc.

Further, the CPU 11 also determines a priority order of the pages to which the image change processing is to be applied on the basis of the attributes. The whole attributes is constituted by plural kinds of attributes as abovementioned, and accordingly, the priority order is determined by weighting the plural kinds of attributes in advance, corresponding to the contents of the image change processing. Further, when conducting the integration print processing and/or the duplex processing, in which plural pages are regarded as one set of processing objects, the CPU 11 determines a page, which is suitable for the image change processing, by regarding the combination of the attributes of each of the plural pages as one of the criteria.

In this connection, it is also applicable that the image processing section 18, other than the CPU 11, conducts the image change processing abovementioned, or takes partial charge of it.

Still further, at a predetermined timing when the copy-printed paper sheet (print product) is ejected from the copier 10, the CPU 11 transmits a charging signal to the fee charge apparatus 50 through the communication section 21. For instance, when an ejecting paper sheet counter, mounted in the vicinity of a paper sheet ejecting opening of an ejecting tray (not shown in the drawings), detects the paper sheet, the CPU 11 is triggered to transmit the charging signal. On the other hand, receiving the charging signal from the copier 10, the fee charge apparatus 50 charges the copy fee.

Figure 10:
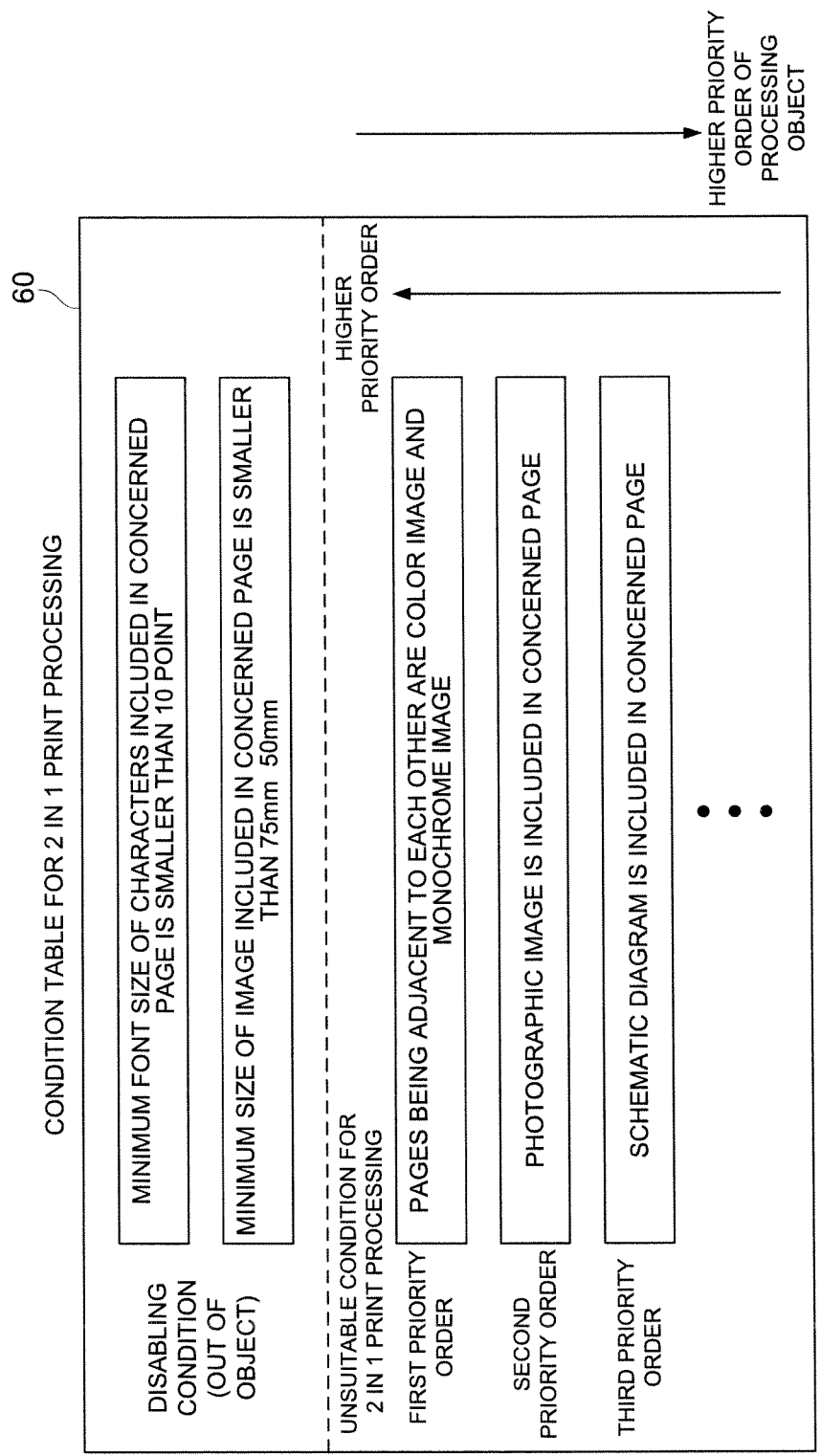
FIG. 10 shows a schematic diagram indicating an example of a condition table stored in a copier embodied in the present invention.
Figure 11:
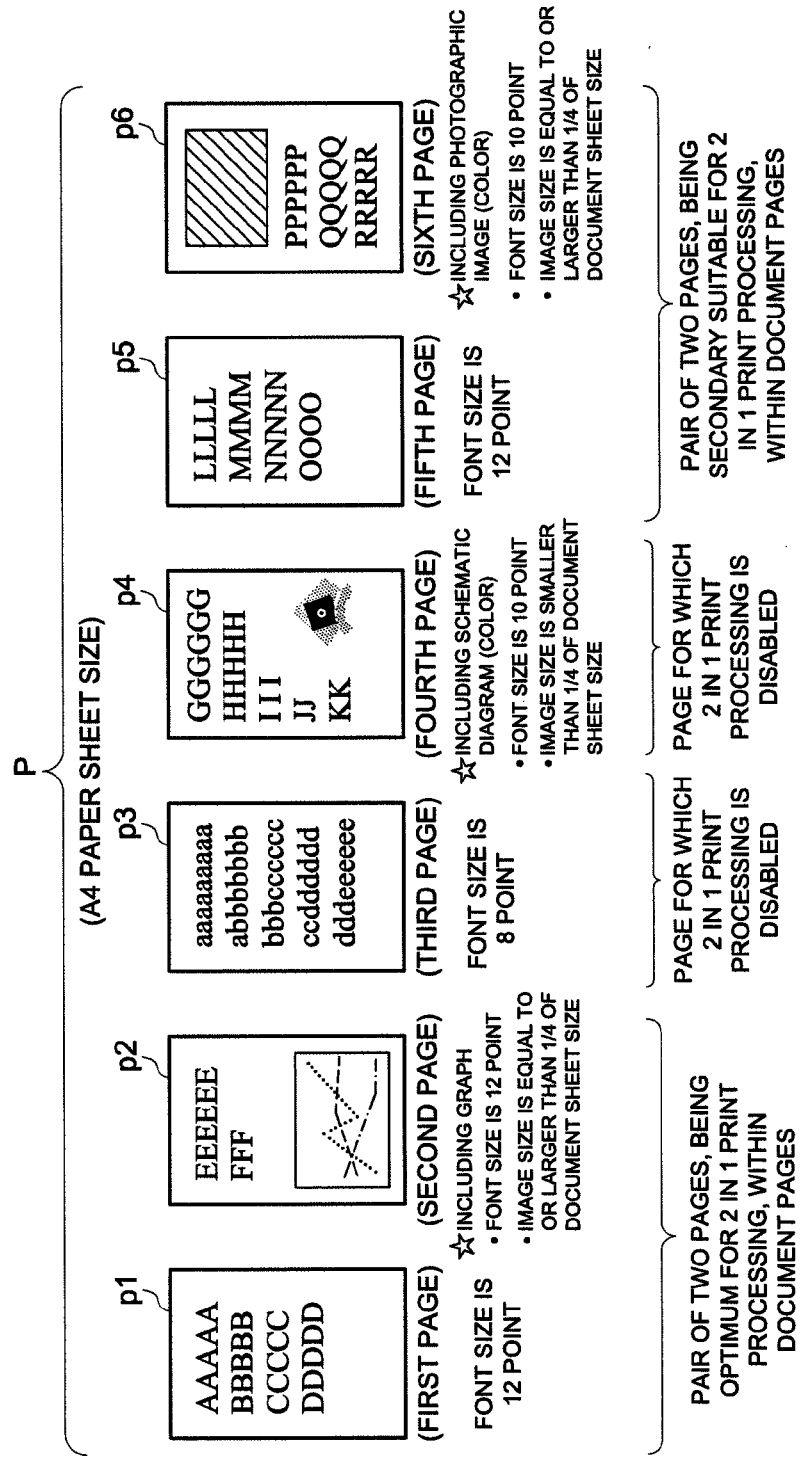
FIG. 11 shows a schematic diagram indicating exemplary pages included in a document, based on which a copier, embodied in the present invention, implements a copy printing operation.

FIG. 10 shows a schematic diagram indicating an example of a condition table 60 stored in the non-volatile storage 15. The condition table 60 is such a table in which conditions for determining the page, which is suitable for the image change processing abovementioned, are registered. Herein, the condition table 60 to be employed for the 2 in 1 print processing is exemplified for explaining use.

In the 2 in 1 print processing when the size of the document and the size of the printed paper sheet are the same as each other, the image size for 1 page is reduced to that of 0.7 times of the original size of the document (variable magnification factor; 70%, area ratio; 50%). Accordingly, there is a fear that characters have been hardly perceptible due to the reduced small size and/or the smudges of the characters. Further, when including the partial image area, there is another fear that an image has been hardly perceptible due to the reduced small size, as well, or some defect of the image has occurred. To avoid such the deficiencies, a page, which fulfills such conditions that the size of characters included in the partial character area of the page (Font Size) is equal to or greater than a certain fixed size, and when including the partial image area, the size of the concerned image is equal to or greater than another certain fixed size, etc., is suitable for the 2 in 1 print processing.

Further, in the size reduction processing of the partial image area, depending on the kind of image data or the deference of the amount of information, sometimes, a certain difference between a way of emerging defect in the information and another way of emerging defect in the other information could be recognized, even if the sizes of both information are reduced by employing the same variable magnification factor. For instance, since the amount of information included in the photographic image is generally greater than that of the schematic diagram, etc., defect in the information of the photographic image possibly becomes great, compared to that included in the other information.

Still further, when the 2 in 1 print processing is applied to the document so as to reduce the amount of charged fee, and when the color page and the black and white page are processed into one page as the result of performing the 2 in 1 printing, the copy fee of the one page concerned is calculated as the color page. Accordingly, this hardly contributes the reduction of the amount of charged fee.

As described in the foregoing, the 2 in 1 print processing is such an image processing that reduces the size of the image itself included in each of the two pages selected as a set of processing objects. Further, in the condition table for the 2 in 1 print processing, a plurality of conditions corresponding to the contents of the processing, namely, considering influence to the abovementioned image quality, caused by the processing concerned, and effect for the reduction of the amount of charged fee, are registered. Still further, the conditions are described by employing the attributes aforementioned.

As shown in FIG. 10, weighted plural conditions (attributes) are registered in the condition table 60. Concretely speaking, the weighted plural conditions, including the conditions that make the image change processing (the 2 in 1 print processing in this SECOND EMBODIMENT) disabled (disabling conditions) and the other conditions that make the image change processing unsuitable (unsuitable conditions), are registered. In the rank of weighting, the disabling conditions are weighted at the heaviest rank, while the unsuitable conditions are weighted in accordance with the contents of the processing associated with the priority orders, respectively.

In the SECOND EMBODIMENT, the disabling conditions are respectively set at the font size and the image size, influence degrees of which are the highest for the image quality.

With respect to the font size, a threshold value is established so as to maintain the size of the characters at a value equal to or greater than the fixed size, even if the size of the characters is reduced to that of 0.7 times of the original size of the document. Although it is possible to establish the threshold value at an arbitral value, it is preferable that the threshold value is set at, for instance, 10 Point or more, so as to maintain the font size of 7 Point even after the size reduction processing. In this SECOND EMBODIMENT, the threshold value of the font size is set at 10 Point, and further, one of the disabling conditions is established as "MINIMUM FONT SIZE OF CHARACTERS INCLUDED IN CONCERNED PAGE IS SMALLER THAN 10 POINT".

As well as the above, with respect to the image size, a threshold value is established so as to maintain the size of the image at a value equal to or greater than the fixed size, even if the size of the partial image area is reduced to that of 0.7 times of the original size of the document. Although it is also possible to establish the threshold value at an arbitral value, it is preferable that the threshold value is set at, for instance, ¼ of the document size, etc., and when A4 size is employed, at 75 mm×50 mm, etc. In this SECOND EMBODIMENT, the threshold value of the image size is set at 75 mm×50 mm, and further, another one of the disabling conditions is established as "MINIMUM SIZE OF IMAGE INCLUDED IN CONCERNED PAGE IS SMALLER THAN 75 mm×50 mm".

Further in the SECOND EMBODIMENT, the unsuitable conditions are established with respect to a combination of page colors (color and monochrome), a presence or absence of the partial image area, a kind of image (photographic image or schematic diagram), etc., and are respectively weighted, associated with the priority orders. Although it is possible to establish a weighted value of each of the conditions at an arbitral value, in this embodiment, the combination of page colors, which hardly contributes to the reduction of the amount of charged fee, is ranked at the heaviest weight position, and the presence or absence of the partial image area is ranked at the weight position being next to the heaviest weight position abovementioned. Further, with respect to the partial image area, corresponding to the difference between the information amounts, the weighted value, in the case that the partial image area includes a photographic image, is ranked at the relatively heavier weight position, and the other weighted value, in the other case that the partial image area includes a schematic diagram, is ranked at the weight position being next to the relatively heavier weight position abovementioned (namely, weighted value of photographic image>weighted value of schematic diagram). Concretely speaking, among the unsuitable conditions for the image change processing, the first priority order is given to the first unsuitable condition of "PAGES BEING ADJACENT TO EACH OTHER ARE COLOR IMAGE AND MONOCHROME IMAGE, RESPECTIVELY", while the second priority order is given to the second unsuitable condition of "PHOTOGRAPHIC IMAGE IS INCLUDED IN CONCERNED PAGE", and the third priority order is given to the third unsuitable condition of "SCHEMATIC DIAGRAM IS INCLUDED IN CONCERNED PAGE".

Still further, when the schematic diagram includes some characters, the font size determined by the abovementioned unsuitable conditions is also applied to the characters included in the schematic diagram concerned. For instance, when the minimum font size of characters included in the schematic diagram is smaller than 10 Point, the concerned characters fall under the unsuitable condition.

Still further, it is applicable that the abovementioned various kinds of conditions and waited ranking positions are established in advance, and the font size and/or the threshold value are settable for the supervisor or the like.

According to the condition table 60 abovementioned, the pages that fall under any one of the disabling conditions are excluded from the processing objects. Further, the other pages that only fall under at least one of the unsuitable conditions are excluded from the processing objects in order of the priority order of the unsuitable condition concerned, higher the first. Accordingly, the higher the priority order of the unsuitable condition under which the page does not fall, the higher the priority order of the processing that is to be applied to the page concerned.

Although the condition table for the 2 in 1 print processing is exemplified in the foregoing, similar kinds of condition tables are also prepared for the 4 in 1 print processing, the 8 in 1 print processing, the duplex printing, and the print density lowering processing, as well.

For instance, in the condition table to be employed for the 4 in 1 print processing and/or the 8 in 1 print processing, it is possible to set the font size and the image size at values being changed from those established in the condition table for the 2 in 1 print processing, while making the unsuitable conditions same as those for the condition table for the 2 in 1 print processing, etc. In the 4 in 1 print processing, when the size of the document and the printing size is the same as each other, by applying the 4 in 1 print processing to the document images, the size of the processed images are reduced to 0.5 times of the original size (variable magnification factor; 50%, area ratio; 25%). Accordingly, the threshold value of the font size may be set at 14 Point, etc., due to the same reason for the 2 in 1 print processing. Further, the threshold value of the image size is set at ½, etc. of the document size, and when the A4 size is employed, it may be set at 105 mm×70 mm, etc. Still further, corresponding to the printing size (paper sheet size), it may be possible to change the threshold value of the image size as needed.

The duplex print processing is such a processing that is to be applied to two pages as a set of processing objects and does not change the size of the image itself included in the page. It is applicable that a combination of page colors, etc., is registered as the disabling condition or the unsuitable condition in the condition table for the duplex print processing. Further, the print density lowering processing is such a processing that is to be applied for lowering the density of printed image, so as to suppress the toner consumption amount in the printing operation. It is applicable that, in the condition table for the print density lowering processing, a threshold value of the minimum density of the image itself included in the page concerned is registered as the disabling condition, while the presence or absence of the partial image area or a kind of the partial image area, etc., is registered as the unsuitable condition.

Next, the operations to be conducted in the copier 10 will be detailed in the following.

Figure 13:
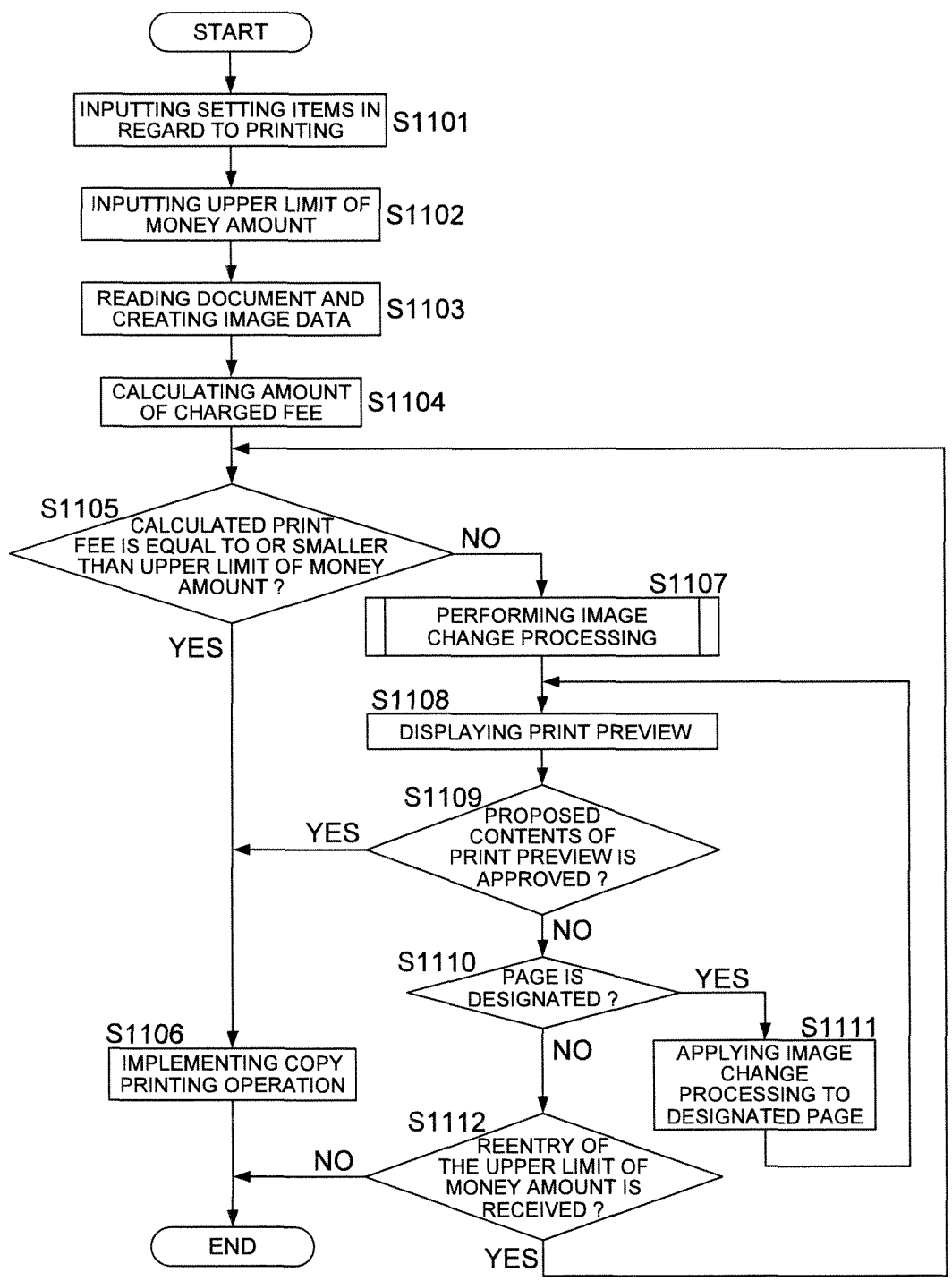
FIG. 13 shows a flowchart indicating a processing flow as a main routine of a copy printing operation to be implemented by a copier embodied in the present invention.

FIG. 13 shows a flowchart indicating a processing flow as a main routine of the copy printing operation. When the copier 10 is activated, the CPU 11 starts the processing flow (START). When implementing the copy printing operation for making a print product from the document, the user of the copy service inputs setting items in regard to the printing, such as a number of copies, a printed image quality, a printing size (a size of output paper sheets), etc., into the copier 10 through the operating display section 16, and further, inputs an upper limit of money amount as the copy fee, desired by the user. Finalizing such the initial inputting operations, the user makes the scanner section the copier 10 read the document concerned.

Successively, the CPU 11 accepts the setting items in regard to the printing and the upper limit of money amount as the copy fee, both inputted by the user through the operating display section 16 (Step S1101, Step S1102), and creates print image data, to be used for the printing operation based on contents of the setting items inputted by the user, from the image data read from the document concerned (Step S1103). After that, the CPU 11 calculates an actual amount of charged fee (required amount of money or print fee), based on a kind of toner, an amount of toner, a number of printed paper sheets, etc., which are to be used when the copy printing operation is actually implemented on the basis of the setting items inputted by the user (Step S1104), and compares the calculated print fee with the upper limit of money amount inputted by the user concerned, so as to determine whether or not the calculated print fee is equal to or smaller than the upper limit of money amount (Step S1105).

Successively, when determining that the calculated print fee is equal to or smaller than the upper limit of money amount (Step S1105; Yes), the CPU 11 implements the copy printing operation based on the image data read from the original document, according to contents of the setting items inputted by the user as it is (Step S1106), and conducts the print fee processing for the copy printing operation implemented in the above, and after that, finalizes the copy processing (END). On the other hand, when determining that the calculated print fee exceeds the upper limit of money amount (Step S1105; No), the CPU 11 enters into a subroutine to perform the image change processing for reducing the print fee to be actually charged (suppressing the print fee to an amount equal to or smaller than the upper limit of money amount) (Step S1107). Then, the CPU 11 makes the operating display section 16 display a print preview, indicating a printout result when the image change processing is actually applied, so as to propose the print preview to the user concerned (Step S1108).

When receiving the operation for approving the proposed contents of the print preview (Step S1109; Yes), the CPU 11 implements the copy printing operation concerned (Step S1106), and conducts the print fee processing for the copy printing operation implemented in the above, and after that, finalizes the copy processing (END). On the other hand, without receiving the operation for approving the proposed contents (Step S1109; No), when the CPU 11 receives the designation of a page to which the image change processing is to be applied, from the user concerned (Step S1110; Yes), the CPU 11 applies the image change processing to the designated page (Step S1111), and then, returns to Step S1108 in order to make the operating display section 16 display a print preview of the concerned page to propose its print preview to the user concerned. Further, without receiving the designation of a page (Step S1110; No), when the CPU 11 receives the reentry of the upper limit of money amount from the user concerned (Step S1112; Yes), the CPU 11 returns to Step S1105. Still further, when a predetermined time has elapsed since the print preview has been displayed, or when receiving the operation for canceling the copy printing operation (Step S1112; No), the CPU 11 finalizes the copy processing without implementing the copy printing operation concerned (END).

In this connection, it is applicable, in the abovementioned copy print processing, that the CPU 11 makes the operating display section 16 display the printout result to be outputted according to the contents of setting items established by the user as the print preview, even if the CPU 11 determines that the calculated print fee is equal to or smaller than the upper limit of money amount (Step S1105; Yes). Further, it is also applicable, in the above case, that the message of "PRINTING OPERATION IS IMPLEMENTED ACCORDING TO CONTENTS OF SETTING ITEMS ESTABLISHED BY USER" or the like is displayed on the print preview in addition to the printout result, so that the CPU 11 implements the printing operation when receiving the operation for approving the proposed contents of the print preview including the message from the user concerned.

In this connection, the image change processing for suppressing the charged fee to a value being lower that the upper limit of money amount will be detailed in the following. Further, the way of determining the page being suitable for the image change processing and the details of the print preview will be also described by exemplifying the 2 in 1 print processing.

For instance, it is assumed that the copy fee for A4 size in the copy printing service is established as 10 yen per one sheet for monochrome image and 20 yen per one sheet for color image. If the copy printing operation, based on the A4 size document constituted by total 10 sheets including 7 sheets of monochrome pages and 3 sheets of color pages, is implemented according to the setting items, such as a number of copies; one copy and a printing size; A4 (output paper sheet size; A4), the charged fee is calculated as 130 yen for one copy, namely, (10 yen/sheet×7+20 yen/sheet×3)×1=130 yen. In the above case, when the user has also inputted 100 yen as the upper limit of money amount, the calculated charged fee exceeds the upper limit by 30 yen. When the calculated charged fee exceeds the upper limit of money amount, the CPU 11 of the copier 10 determines a number of pages to be employed for the 2 in 1 print processing so as to reduce the charged fee to a value being equal to or lower than the upper limit of money amount, based on the money amount difference between the calculated charged fee and the upper limit of money amount, the number of document paper sheets (the number of monochrome pages and the number of color pages), the contents of print setting items (the number of copies, the printing size, etc.), the kind of toner, the amount of toner and the copy fee when the copy printing operation is implement according to the print setting items inputted by the user concerned, etc.

When reducing the charged fee to a value being equal to or lower than the upper limit of money amount, considering the benefit of the service provider (sale proceeds), it is preferable that the charged fee is determined as such a value that is equal to or lower than the upper limit of money amount and is as nearer to the upper limit of money amount as possible. In the abovementioned case, in order to suppress the charged fee to 100 yen being equal to the upper limit of money amount by reducing the number of printed paper sheets, it is necessary to eliminate either 3 printed sheets of monochrome pages, or 1 printed sheet of monochrome page and 1 printed sheet of color page. Accordingly, to achieve the abovementioned reduction processing only by employing the monochrome pages, it is necessary to apply either the 2 in 1 print processing to 6 monochrome pages or the 4 in 1 print processing to 4 monochrome pages. In this SECOND EMBODIMENT, giving a priority to the 2 in 1 print processing, the CPU 11 determines the 6 monochrome pages, namely, 3 pairs of two monochrome pages being adjacent to each other, as the pages to which the 2 in 1 print processing is applied.

Successively, referring to the contents of the condition table 60, the CPU 11 selects the pages being suitable for the 2 in 1 print processing (refer to FIG. 10). In the above selection process, the CPU 11 excludes a page that falls under at least one of the disabling conditions from the processing objects, and determines the residual pages as the candidates of the processing objects. Among the candidate pages, a pair of two pages that do not fall under the unsuitable condition ranked at a higher priority position and are adjacent to each other is preferentially selected as the processing object. Referring to a document P shown in FIG. 11, this selecting procedure will be detailed in the following.

The document P exemplified in this FIRST EMBODIMENT is constituted by total 6 pages (6 sheets), the size of which are A4 size. A document sheet p1, corresponding to the first page of the document P, includes characters, the font size of which is 12 Point. A document sheet p2, corresponding to the second page of the document P, includes a graph, the size of which is equal to or larger than ¼ of the document sheet size, and characters, the font size of which is 12 Point. A document sheet p3, corresponding to the third page of the document P, includes characters, the font size of which is 8 Point. A document sheet p4, corresponding to the fourth page of the document P, includes a color image, the size of which is smaller than ¼ of the document sheet size, and characters, the font size of which is 10 Point. A document sheet p5, corresponding to the fifth page of the document P, includes characters, the font size of which is 12 Point, as well as those of the document sheet p1. A document sheet p6, corresponding to the sixth page of the document P, includes a color photographic image, the size of which is equal to or larger than ¼ of the document sheet size, and characters, the font size of which is 10 Point.

With respect to the document P, initially, the CPU 11 excludes the pages that fall under at least one of the disabling conditions registered in the condition table 60 (refer to FIG. 10) from the processing objects. Herein, since the font size of the characters included in the document sheet p3 is 8 Point, the document sheet p3 falls under the disabling condition of "MINIMUM FONT SIZE OF CHARACTERS INCLUDED IN CONCERNED PAGE IS SMALLER THAN 10 POINT (THRESHOLD VALUE)". Further, since the size of the image included in the document sheet p4 is smaller than ¼ of the document sheet size, the document sheet p4 falls under the disabling condition of "MINIMUM SIZE OF IMAGE INCLUDED IN CONCERNED PAGE IS SMALLER THAN 75 mm×50 mm" (¼ of A4 size is equal to 75 mm×50 mm, serving as the THRESHOLD VALUE). Accordingly, the CPU 11 excludes the document sheet p3 and the document sheet p4, which fall under the disabling conditions, from the processing objects, while, determines the residual pages, which fall under none of the disabling conditions, as the candidates of the processing objects.

Still successively, in order to determine whether or not the 2 in 1 print processing can be applied to the residual pages, the CPU 11 confirms whether or not at least one pair of two pages being adjacent to each other (continued two pages) is included in the residual pages. Herein, since two pairs, including the pair of the document sheet p1 and the document sheet p2 and the other pair of the document sheet p5 and the document sheet p6, exist within the residual pages, the CPU 11 determining that the 2 in 1 print processing is applicable for this case.

When two or more pairs of pages, being adjacent to each other, exist within the residual pages, the CPU 11 verifies each of the concerned pages by referring to the unsuitable conditions, so as to determine which pare of the pages should be preferentially processed in the 2 in 1 print processing. Herein, since the document sheet p1 and the document sheet p5 fall under none of the unsuitable conditions, the highest priority order of the processing object is given to them. However, since the document sheet p1 and the document sheet p5 are not adjacent to each other, it is impossible to apply the 2 in 1 print processing to the pair of them. On the other hand, since the document sheet p2 includes the graph, the document sheet p2 falls under the third unsuitable condition of "SCHEMATIC DIAGRAM IS INCLUDED IN CONCERNED PAGE" to which the third priority order is given. Further, since the document sheet p6 includes the photographic image, the document sheet p6 falls under the second unsuitable condition of "PHOTOGRAPHIC IMAGE IS INCLUDED IN CONCERNED PAGE" to which the second priority order is given. Accordingly, the CPU 11 determines that the document sheet p2 is more suitable for the 2 in 1 print processing rather than the document sheet p6, since the document sheet p2 falls under the third unsuitable condition being lower than the second unsuitable condition in the priority order, and further determines that the pair of the document sheet p1 and the document sheet p2 is most suitable for the 2 in 1 print processing within the document P, and the pair of the document sheet p5 and the document sheet p6 is secondary suitable for the 2 in 1 print processing within the document P, and selects the pair of the document sheet p1 and the document sheet p2 as the most-preferential processing object. Such the processing procedure as described in the above is employed for selecting the pages being suitable for the 2 in 1 print processing.

Still successively, the CPU 11 applies the 2 in 1 print processing to the consecutive two pages selected from the document P, and makes the operating display section 16 display its print preview thereon, so as to propose it to the user.

Figure 12:
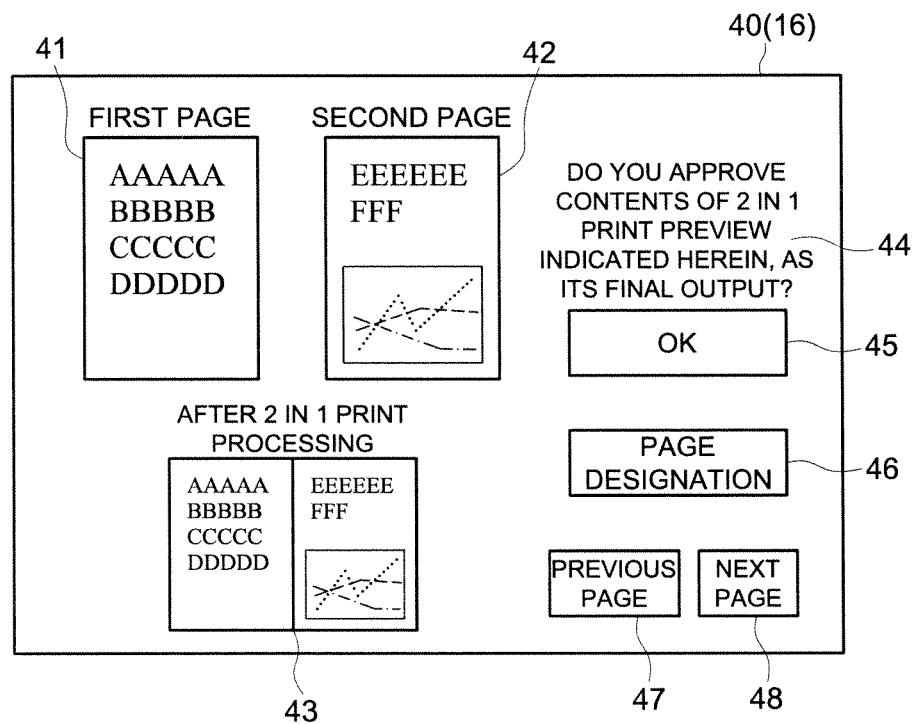
FIG. 12 shows a schematic diagram indicating an exemplary preview screen to be displayed on an operating display section of a copier embodied in the present invention.

FIG. 12 shows a schematic diagram indicating an example of a preview screen 40 to be displayed on the operating display section 16, which includes the print previews to be created by applying the 2 in 1 print processing to the document P. The preview screen 40 to be displayed on the operating display section 16 includes a first page 41 and a second page 42 (corresponding to the first page and the second page of the document P in the SECOND EMBODIMENT) serving as the processing objects of the 2 in 1 print processing, a 2 in 1 print-processed print preview 43, a confirmation message 44 to confirm whether or not the user approves the contents of the 2 in 1 print-processed print preview 43 as a result of the actual implementation of the 2 in 1 printing, an implementation button (OK button) 45 to accept an instruction for implementing the 2 in 1 printing, a page designation button 46 to accept an operation for designating the pages to which the 2 in 1 print processing is to be applied, a previous page button 47 to accept an operation for shifting the page currently displayed on the preview screen 40 to the previous page, and a next page button 48 to accept an operation for shifting the page currently displayed on the preview screen 40 to the next page. Further, in addition to the above, a copy fee (an amount of charged fee) to be charged after the 2 in 1 print processing is completed is also displayed on the preview screen 40.

When the implementation button 45 is depressed, the CPU 11 implements the copy printing operation according to the contents of the 2 in 1 print-processed print preview 43. When the page designation button 46 is depressed, the CPU 11 enters into a state of accepting the designation of pages to which the 2 in 1 print processing is to be applied. Successively, when the previous page button 47 is depressed in the abovementioned state, the CPU 11 sequentially shifts the first page 41 and the second page 42, currently displayed on the preview screen 40 as the current processing objects of the 2 in 1 print processing, to the previous pages to be newly displayed. On the other hand, when the next page button 48 is depressed in the abovementioned state, the CPU 11 sequentially shifts the first page 41 and the second page 42, currently displayed on the preview screen 40 as the current processing objects of the 2 in 1 print processing, to the next pages to be newly displayed.

For instance, when the next page button 48 is depressed in the state that the first page and the second page are displayed as shown in this SECOND EMBODIMENT, the second page and the third page are displayed. Further, every time when the next page button 48 is depressed, the current pair of pages displayed on the screen is sequentially changed one by one to the next pair of pages, such as the pair of the third page and the fourth page, the pair of the fourth page and the fifth page, so on. In the same way, every time when the previous page button 47 is depressed, the current pair of pages displayed on the screen is sequentially changed one by one to the previous pair of pages in the reverse direction. In this connection, in such a case that the previous page button 47 is depressed in the state that the first page and the second page are currently displayed as shown in this SECOND EMBODIMENT, it is applicable that the current pair of pages displayed on the screen is changed to the final pair of pages. Conversely, in such a case that the next page button 48 is depressed in the state that the final pair of pages is currently displayed, it is applicable that the current pair of pages displayed on the screen is changed to the leading pair of pages.

Still successively, the CPU 11 applies the 2 in 1 print processing to the pair of pages designated by the operation of depressing the previous page button 47 and/or the next page button 48, so as to make the operating display section 16 display the 2 in 1 print-processed print preview 43, thereon. Then, when the implementation button 45 is depressed, the CPU 11 implements the copy printing operation according to the contents of the 2 in 1 print-processed print preview 43. In this case, the CPU 11 implements the 2 in 1 printing for the pair of two pages designated. In this connection, it is also applicable that a cancel button to accept a canceling operation is displayed on the preview screen 40, so that, when the cancel button is depressed, the CPU 11 cancels the designation of the page, the 2 in 1 printing without implementing it or the copy printing operation of the document P itself.

Further, the CPU 11 conducts the 2 in 1 print processing, the 4 in 1 print processing, the 8 in 1 print processing, the duplex print processing and the print density lowering processing, which are categorized in the image change processing, according to the predetermined priority order, so as to make the amount of charged fee being equal to or lower than the upper limit of money amount. Although the predetermined priority order could be established as an arbitral order, the copier 10 in this SECOND EMBODIMENT is so constituted that the CPU 11 conducts the abovementioned processing in order of the 2 in 1 print processing→the 4 in 1 print processing→the 8 in 1 print processing→at least one of the duplex print processing and the print density lowering processing. Concretely speaking, when the calculated amount of charged fee exceeds the upper limit of money amount inputted by the user, at first, the CPU 11 determines whether it is possible or impossible to reduce the calculated amount of charged fee to a value being equal to or lower than the upper limit of money amount by applying the 2 in 1 print processing. When determining that it is impossible, the CPU 11 further determines whether it is possible or impossible by applying the 4 in 1 print processing. When still determining that it is impossible, the CPU 11 still further determines whether it is possible or impossible by applying the 8 in 1 print processing. When yet determining that it is impossible even by applying any one of all of the N in 1 print processing, finally, the CPU 11 applies the at least one of the duplex print processing and the print density lowering processing to the concerned pages as the other image change processing.

In the integration printing (N in 1 printing), the more the number of pages to be integrated is, the smaller the number of printed paper sheets to be outputted becomes. Accordingly, the reduction amount of charged fee, achieved by cutting the number of printed paper sheets down, is relatively great, and as a result, it becomes possible to reduce the amount of copy fee lower than ever. However, as a side effect, since the reduction factor of the image is set at a small value, the influence to the image quality becomes great. On the other hand, since the size of the image is not reduced in the duplex print processing, a little influence to the image quality would emerge as a result of applying the duplex print processing, compared to a result of applying the integration print processing. However, it would be considered that most of all users preferentially select the one-side print processing. Further, since the size of the image is not reduced in the print density lowering processing, a little influence to the image quality would emerge as a result of applying the print density lowering processing, as well. However, there is a possibility that the user would worry about the influence to the image quality caused by lowering the print density. Considering the abovementioned factors, it is preferable that the priority order of the various kinds of processing categorized in the image change processing is established as the similar manner as aforementioned. Further, when the print fee to be charged to the duplex printing is set at a value cheaper than that to be charged to the 2 in 1 printing, or when the effect of lowering the amount of the print fee by reducing the amount of toner consumption is great, etc., it is more preferable that the priority order of the various kinds of processing is established as the same as aforementioned.

Further, when the difference between the amount of the print fee and the upper limit of money amount is great, the possibility for employing either the 4 in 1 print processing or the 8 in 1 print processing, which can drastically reduce the amount of the print fee, becomes high. In this case, it would possibly occur that a considerable deterioration of the image quality, being unacceptable for the user, such as a defect of the information being important for the user, a deteriorated appearance being hardly visible for the user, or the like, is generated in the outputted print product. In case that, as a result of applying the image change processing, it is impossible not only to avoid the deterioration of the image quality, but also to acquire the image quality desired by the user, when the upper limit of money amount inputted by the user is employed, it is applicable that the resulted image of applying the image change processing (print preview) and a warning message, indicating such as "WITH RESPECT TO , ITS QUALITY IS LOWER THAN ACCEPTABLE QUALITY" or "WITH RESPECT TO , ITS QUALITY LEVEL IS LOWER THAN STANDARD LEVEL", or the like, are displayed in the preview screen 40. Then, when the user approves the contents of the preview screen 40 proposed by the copier 10, it is applicable that the user conducts the inputting operation for implementing the copy printing operation in accordance with the setting items of the preview screen 40, while when the user disapproves the contents of the preview screen 40 due to the deterioration of the image quality, it is applicable that the user conducts operations for reentry of the upper limit of money amount or reapplication of the image change processing.

Next, referring to FIG. 13, the image change processing, serving as the aforementioned subroutine of the copy print processing, will be detailed in the following. Hereinafter, the outline and the details of the image change processing will be described successively and stepwise in the following. In this connection, in the image change processing, the CPU 11 retrieves a specific N-in-1 print processing, which makes it possible to reduce the amount of charged fee to a value being equal to or lower than the upper limit of money amount, from the plural kinds of integration print processing abovementioned, in order of the number of pages to be integrated, the smallest first. Further, when it is impossible to retrieve the specific N-in-1 print processing for achieving the abovementioned goal, the CPU 11 employs the other image change processing (the duplex print processing or the print density lowering processing) to cope with the abovementioned goal.

Figure 14:
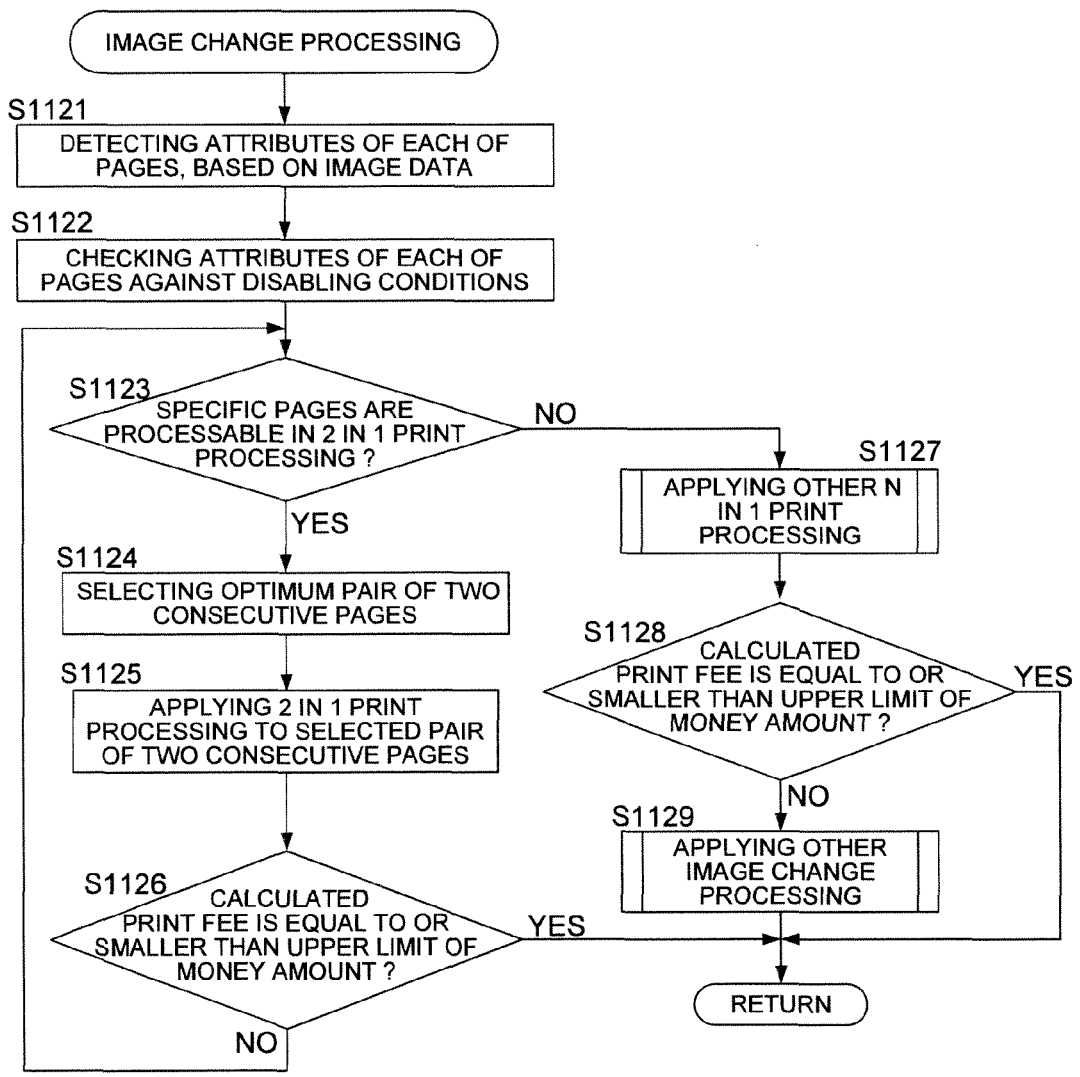
FIG. 14 shows a flowchart indicating a rough processing flow of an image change processing to be implemented by a copier embodied in the present invention.

FIG. 14 shows a flowchart indicating a rough processing flow of the image change processing. Starting the image change processing, the CPU 11 detects the attributes of each of the pages based on the image data read from the document by the scanner section 17 (Step S1121). Successively, the CPU 11 checks the attributes of each of the pages against the disabling conditions registered in the condition table 60, so as to determine whether or not each of the pages falls under at least one of the disabling conditions (conditional judgment of 2 in 1 print processing for each page) (Step S1122).

When determining that specific pages fall under none of the disabling conditions, namely, the specific pages are processable in the 2 in 1 print processing (Step S1123; Yes), the CPU 11 further checks the attributes of each of the specific pages against the unsuitable conditions registered in the condition table 60, so as to select a pair of two consecutive pages, which is optimum to be processed in the 2 in 1 print processing (Step S1124). Then, the CPU 11 applies the 2 in 1 print processing to the selected pair of two consecutive pages (Step S1125). Successively, when determining that the amount of charged fee after processing is equal to or lower than the upper limit of money amount (Step S1126; Yes), the CPU 11 returns the processing to the main routine, while when determining that the amount of charged fee after processing still exceeds the upper limit of money amount (Step S1126; Yes), the CPU 11 returns the processing to the Step S1123.

On the other hand, when determining that all of the pages fall under at least one of the disabling conditions, namely, none of the pages are processable in the 2 in 1 print processing (Step S1123; No), the CPU 11 quits applying the 2 in 1 print processing to the pages concerned, but applies the other N in 1 print processing, namely, either the 4 in 1 print processing or the 8 in 1 print processing (Step S1127). When applying either the 4 in 1 print processing or the 8 in 1 print processing, the CPU 11 refers to a condition table corresponding to either the 4 in 1 print processing or the 8 in 1 print processing. Successively, when determining that the amount of charged fee after the other N in 1 print processing has been applied is equal to or lower than the upper limit of money amount (Step S1128; Yes), the CPU 11 returns the processing to the main routine, while when determining that the amount of charged fee after the other N in 1 print processing has been applied still exceeds the upper limit of money amount (Step S1128; No), the CPU 11 applies the other image change processing, namely, at least one of the duplex print processing or the print density lowering processing, to the document image data (Step S1129), and then, returns the processing to the main routine (RETURN). When applying either the duplex print processing or the print density lowering processing, the CPU 11 refers to a condition table corresponding to either the duplex print processing or the print density lowering processing.

In the foregoing, the outline of the image change processing has been described.

Figure 15:
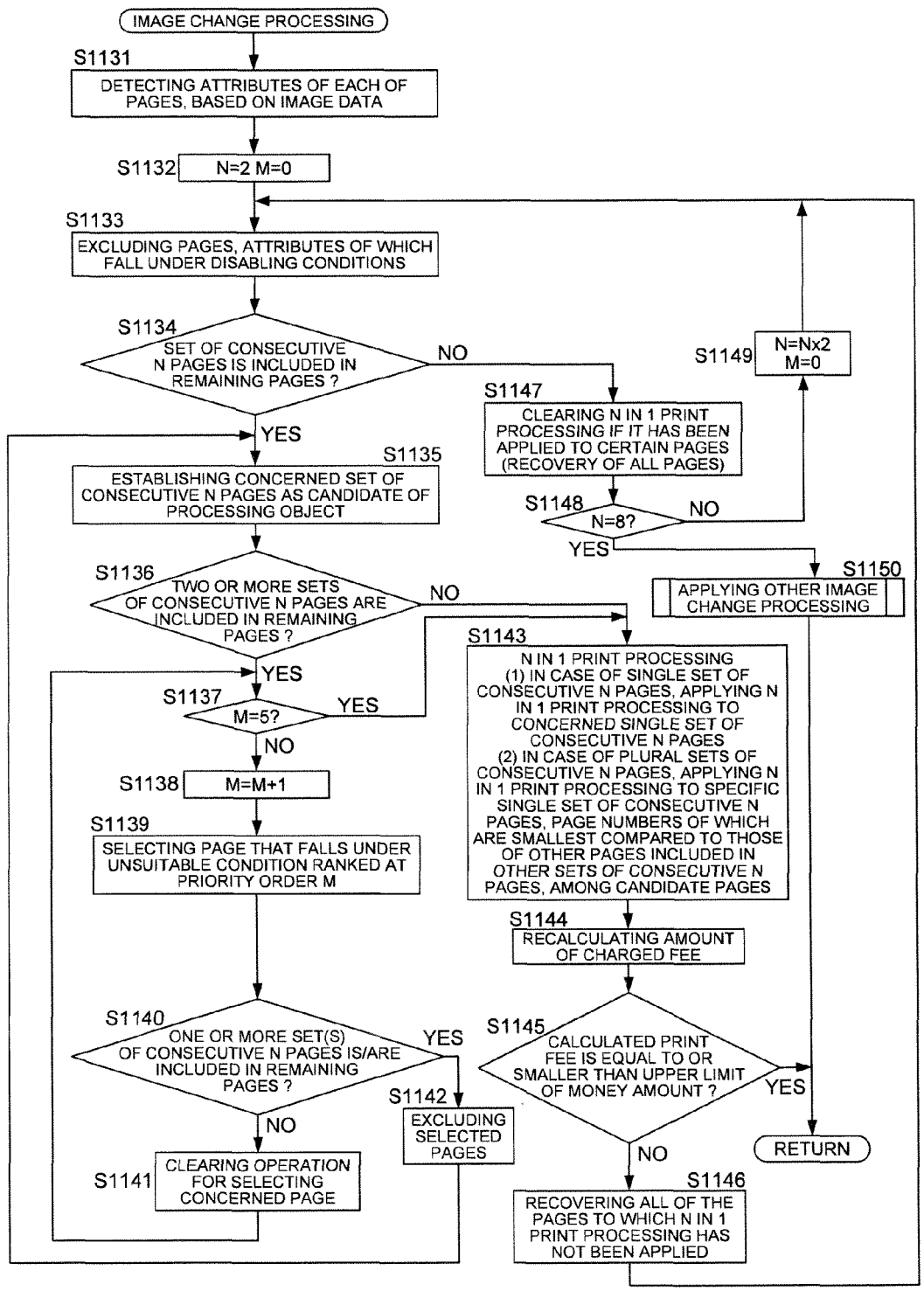
FIG. 15 shows a flowchart indicating a detailed processing flow of an image change processing to be implemented by a copier embodied in the present invention.

FIG. 15 shows a flowchart indicating a detailed processing flow of the image change processing. In the flowchart shown in FIG. 15, the N in 1 print processing described in the processing steps from Step S1122 to Step S1127 indicated in the rough flow shown in FIG. 14, specifically described in the "selection of optimum pair of pages" of Step S1124, is detailed.

In this flowchart, as described in Step S1122 shown in FIG. 14, initially, the CPU 11 excludes the pages that falls under the disabling conditions registered in the condition table 60 from all of the pages included in the document. Further, when the residual pages includes the specific pages, which are processable in the N in 1 print processing, and if the specific pages constitutes a set of pages (namely, consecutive N pages only constitutes a single set of consecutive N pages), the concerned set of pages is made to be the processing object. When the specific pages constitutes plural sets of pages, the CPU 11 checks the attributes of each of the pages included in the plural sets of pages against the unsuitable conditions registered in the condition table 60 in order of the priorities of them, highest first, so as to sequentially exclude the pages that fall under any one of the unsuitable conditions, and then, if a specific set of pages remains without being excluded, the CPU 11 select the specific set of pages as the one optimum for the processing object. When remaining sets of pages disappear at a time due to a specific unsuitable condition in the mid course of priority order, the CPU 11 sequentially checks the attributes of each page, included in the remaining sets of pages just before disappearance of them, against other unsuitable conditions, in order from an unsuitable condition, the priority which is lower than that of the specific unsuitable condition and positioned next to it, so as to sequentially exclude the pages that fall under any one of the other unsuitable conditions, as well as the above, and then, if a specific set of pages remains without being excluded, the CPU 11 selects the specific set of pages as the one optimum for the processing object.

In case that the remaining sets of pages disappear at a time due to an unsuitable condition ranked at the lowest priority position, the CPU 11 selects a single set of consecutive N pages having the smallest page numbers among the remaining sets of pages, which finally disappear, as the processing object. Further, in case that some sets of pages still remain even after checking them against the unsuitable condition ranked at the lowest priority position, the CPU 11 selects a single set of consecutive N pages having the smallest page numbers among the remaining sets of pages, which finally remain, as the processing object.

Further, when the amount of charged fee, calculated after the N in 1 print processing is applied to the single set of pages, exceeds the upper limit of money amount, all of the pages excluded by then (pages to which the N in 1 print processing have not been applied) are recovered, so as to repeat the operation for retrieving again a single set of consecutive N pages, which is optimum for the N in 1 print processing, from the recovered pages, until the calculated amount of charged fee is reduced to a value being equal to or smaller than the upper limit of money amount. When none of the recovered pages are processable in the N in 1 print processing, the CPU 11 shifts the current N in 1 print processing to the next one (2 in 1 print processing→4 in 1 print processing→8 in 1 print processing), and further, shifts to the other image change processing. Further, herein, an exemplary case in which five unsuitable conditions respectively having priority orders 1 through 5 are registered in the condition table 60 will be detailed in the following.

After starting the image change processing and detecting the attributes of each of the pages based on the image data read from the document by the scanner section 17 (Step S1131), the CPU 11 sets a variable N, indicating a kind of the N in 1 print processing (number of pages to be integrated), at 2, and sets a variable M, indicating a priority order of each of the unsuitable conditions registered in the condition table 60, at 0 (zero) (Step S1132).

Successively, the CPU 11 checks the attributes of each of the pages included in the document against the disabling conditions registered in the condition table 60 for the N in 1 print processing (at first, the condition table 60 for the 2 in 1 print processing), so as to exclude pages that fall under at least one of the disabling conditions from all of the pages included in the document (Step S1133), and then, determines whether or not at least a set of consecutive N pages is included in the remaining pages (at first, a pair of consecutive two pages) (Step S1134). When determining that at least a set of consecutive N pages is included in the remaining pages, the CPU 11 establishes the concerned set of consecutive N pages as a candidate of the processing object (Step S1135), and then, further, determines whether or not two or more sets of consecutive N pages are included in the remaining pages (Step S1136).

Still successively, when determining that two or more sets of consecutive N pages are included in the remaining pages (Step S1136; Yes), the CPU 11 further determines whether the variable M is equal to 5 or smaller than 5 (Step S1137). When determining that the variable M is smaller than 5 (Step S1137; No), the CPU 11 adds 1 to the variable M, to check the attributes of each of the candidate pages against the unsuitable condition ranked at the priority order M (=M+1), so as to select a concerned page (Step S1139). In this connection, if none of the pages fall under the unsuitable condition ranked at the priority order M, the operation for selecting the concerned page is not performed.

Still successively, excluding the selected pages, the CPU 11 determines whether or not one or more set(s) of consecutive N pages is/are included in the remaining pages (Step S1140). When determining that no set of consecutive N pages is included in the remaining pages (Step S1140), namely, all of the sets of candidate pages have disappeared, the CPU 11 clears the operation for selecting the concerned page, and returns the processing to Step S1137 (Step S1141).

When determining that the variable M is still smaller than 5 (Step S1137; No), the CPU 11 again adds 1 to the variable M, and then, repeats the processing from Step S1139 to the later steps. Accordingly, when all of the sets of consecutive N pages disappear at an unsuitable condition ranked at a specific priority order in a mid course of searching out a set of consecutive N pages, being optimum for the image change processing, from the plural sets of consecutive N pages remained by excluding the pages that fall under the disabling conditions, the CPU 11 sequentially conducts the matching determination processing for checking the remaining sets of pages just before disappearance of them against unsuitable conditions, in order from the unsuitable condition ranked at the next priority order.

On the other hand, in Step S1140, when determining that one or more set(s) of consecutive N pages is/are included in the remaining pages (Step S1140; Yes), the CPU 11 excludes the selected pages (pages that fall under the unsuitable condition ranked at the priority order M) (Step S1142), the CPU 11 returns the processing to Step S1135. Then, the CPU 11 establishes only the remaining pages as the candidates of the processing object, and conducts the processing after Step S1136.

In Step S1136, when determining that two or more sets of consecutive N pages are not included in the remaining pages (Step S1136; No), namely, when determining that only a single set of consecutive N pages is included in the remaining pages, the CPU 11 applies the N in 1 print processing to the concerned single set of consecutive N pages (Step S1143). According to above, when determining that at least a set of consecutive N pages is included in the residual pages remained by excluding pages that fall under at least one of the disabling conditions from all of the pages included in the document, and when only a single set of consecutive N pages is included in the residual pages, the CPU 11 applies the N in 1 print processing to this single set of consecutive N pages. On the other hand, when determining that plural sets of consecutive N pages are included in the remaining pages (Step S1136; Yes), the CPU 11 sequentially conducts the matching determination processing for checking each of pages included in the plural sets of consecutive N pages against the unsuitable conditions, in order of priority orders of them, highest the first, so as to exclude the matched pages one by one from the plural sets of consecutive N pages. If a single set of consecutive N pages still remains as a result of the above-mentioned processing, this set of consecutive N pages is determined as the optimum one, to which the CPU 11 applies the N in 1 print processing.

In Step S1137, even when determining that the variable M is equal to 5 (Step S1137; Yes), namely, even when the matching determination processing is repeated up to an unsuitable condition, priority order of which is ranked at the lowest position (in this SECOND EMBODIMENT, the fifth position), the CPU 11 implements the N in 1 print processing (Step S1143). In this case, since the plural sets of consecutive N pages exist, the CPU 11 applies the N in 1 print processing to a single set of consecutive N pages, page numbers of which are the smallest compared to those of other pages included in other sets of consecutive N pages, among the plural sets of consecutive N pages. According to the above, when all of the remaining plural sets of consecutive N pages have disappeared at a time due to the unsuitable condition, priority order of which is ranked at the lowest position, the CPU 11 applies the N in 1 print processing to the single set of consecutive N pages, the page numbers of which are the smallest compared to those of the other pages included in the other sets of consecutive N pages, among the plural sets of consecutive N pages, which finally disappeared. Further, when plural sets of consecutive N pages still remain even checking them against the unsuitable condition, the priority order of which is ranked at the lowest position, the CPU 11 applies the N in 1 print processing to the single set of consecutive N pages, the page numbers of which are the smallest compared to those of the other pages included in the other sets of consecutive N pages, among the plural sets of consecutive N pages, which finally remained.

Still successively, completing the N in 1 print processing, the CPU 11 recalculates the amount of charged fee (Step S1144), and then, determines whether or not the recalculated amount of charged fee is equal to or smaller than the upper limit of money amount (Step S1145). When determining that the recalculated amount of charged fee is equal to or smaller than the upper limit of money amount (Step S1145; Yes), the CPU 11 returns the processing to the main routine (RETURN).

On the other hand, when determining that the recalculated amount of charged fee still exceeds the upper limit of money amount (Step S1145; No), the CPU 11 recovers all of the pages to which the N in 1 print processing has not been applied, and then, returns the processing to Step S1133 (Step S1146), so as to retrieve processing objective pages, which are suitable for the next N in 1 print processing, namely, a single set of consecutive N pages, by repeating the processing steps after Step S1133. If the suitable pages are found out, the CPU 11 applies the N in 1 print processing to the concerned single set of consecutive N pages, so as further reduce the calculated amount of charged fee.

In Step S1134, when determining that no set of consecutive N pages is included in the remaining pages (Step S1134; No), the CPU 11 clears the N in 1 print processing if it has been applied to certain pages, and then, recovers the all of the pages including the certain pages to which the N in 1 print processing has been already applied (Step S1147). Successively, the CPU 11 determines whether or not the variable N is equal to 8 (Step S1148). When determining that the variable N is not equal to 8 (Step S1148; No), the CPU 11 multiply the variable N by 2, sets the variable M at 0 (zero) and returns the processing to Step S1133. According to the above process, the operation for selecting pages being suitable for the next N in 1 print processing and the N in 1 print processing for the selected pages are conducted, and if the amount of charged fee, calculated after the N in 1 print processing is completed, becomes equal to or smaller than the upper limit of money amount, the processing returns to the main routine. On the other hand, when determining that the variable N is equal to 8 (Step S1148; Yes), namely, when the N in 1 print processing has shifted up to the 8 in 1 print processing, the CPU 11 applies the other image change processing to the pages concerned (Step S1150), and returns the processing to the main routine (RETURN)

As described in the foregoing, according to the copier 10 embodied in the present invention, the CPU 11 detects the attributes of each of the pages of the document, represented by the image data acquired by scanning the document, and based on the attributes detected in the above, determines specific pages being suitable for applying a predetermined image processing (image change processing) among all of the pages included in the document, so as to apply the predetermined image processing to the specific pages. Accordingly, it becomes possible to exclude such pages that are unsuitable for the predetermined image processing due to the considerable deterioration of the image quality, caused by applying the concerned processing to images included in the pages. Therefore, it becomes possible for the user not only to automatically determine the pages being suitable for the concerned processing, but also to automatically apply the predetermined image processing to the pages, without conducting the operations for selecting the processing objective pages, changing the setting items for the image processing, etc.

Further, in this SECOND EMBODIMENT of the present invention, the priority order of each of the pages being suitable for applying the predetermined image processing is also determined on the basis of the aforementioned attributes. Concretely speaking, the CPU 11, serving as a control section of the copier 10, registers plural kinds of attributes, which are respectively weighted according to the contents of the image processing to be applied, into the condition table 60, so as to determine the priority order of each of the pages to be processed, based on the weight of the attributes (disabling conditions and unsuitable conditions) registered in the condition table 60. Accordingly, when plural pages are to be candidates of the processing objects, it becomes possible to sequentially apply the predetermined image processing to the plural pages in suitability order of them, the most suitable one first. Further, it also becomes possible to apply the predetermined image processing to only the necessary pages. Still further, it also becomes possible to easily determine the priority order of each of the pages by using the abovementioned condition table 60. When each of the plural kinds of processing is conducted by changing them form one to another as shown in the SECOND EMBODIMENT of the present invention, it becomes possible to sequentially apply the predetermined image processing to each of the pages in order from the one being more suitable than the next one, by preparing the condition table 60 for every processing.

Still further, according to the SECOND EMBODIMENT of the present invention, when the user of the copy service conducts inputting operations for establishing the setting items and for inputting the upper limit of money amount, in regard to the desired printing operation, the CPU 11 compares an amount of copy charge, to be charged at the time when the copy printing operation is implemented on the basis of the setting items established by the user, and the upper limit of money amount, inputted by the user, with each other, so that, when the amount of copy charge is greater than the upper limit of money amount as a result of the above comparison, the CPU 11 applies the predetermined image processing, which makes it possible to reduce the amount of copy charge by reducing the number of printed paper sheets and/or the amount of toner consumption, to the pages being suitable for this processing. Accordingly, when the predetermined image processing is implemented to cope with such the shortage of the money amount in the copy service as abovementioned, it becomes possible to easily determine the pages being suitable for the predetermined image processing concerned, without burdening the user with cumbersome operations. Still further, in the case that the predetermined image processing is implemented so as to suppress the amount of toner consumption at the time when the residual amount of toner becomes short, it becomes possible to easily determine the pages being suitable for the predetermined image processing concerned, without burdening the user with cumbersome operations, as well.

In the foregoing, the SECOND EMBODIMENT of the present invention has been described referring to the drawings. However, the scope of the present invention is not limited to the aforementioned SECOND EMBODIMENT. Modifications and/or additions made by a skilled person without departing from the spirit and scope of the invention shall be included in the scope of the present invention.

For instance, the scope of the predetermined image processing (image change processing) is not limited to the integration print processing, the duplex print processing and the print density lowering processing, exemplified in the SECOND EMBODIMENT of the present invention. It is also applicable that the predetermined image processing also includes the variable power processing for achieving the various kinds of variable power functions, by which an image size can be reduced according to the variable magnification factor and/or the fixed size designated by the user, the resolution lowering processing for suppressing the amount of toner consumption by lowering the resolution of the image, etc.

Incidentally, in both the FIRST EMBODIMENT and the SECOND EMBODIMENT of the present invention, the scope of the objective image is not limited to the document image, exemplified in both the embodiments. For instance, an image file, etc., based on which the integration printing, the variable power printing or the like is requested to be implemented from the personal computer, etc., which are coupled to the copier 10 so that both can communicate with each other, is also applicable as the objective image.

Further, other than the coin vender that accepts either a coin or a paper note as the charged money, any one of: a card vender that accepts a prepaid card as the payment of the charged money; a counter device, such as a sheet counter that counts a number of printed paper sheets (a number of printed paper sheets of one-side/both-side, a number of printed paper sheets of color/monochrome, etc.), a copy fee counter that counts printing fees, etc.; etc., is also applicable as the fee charge apparatus 50.

Still further, it is needless to say that the LED (light Emitting Diode) printer in which the photoreceptor drum is scanned by the LED array, instead of the laser beam, or the other type of printer, such as the ink-jet printer, the thermal transferring printer, etc., are also applicable as the printer section 19 of the copier 10.

Yet further, the present invention is applicable not only for the full color copier described in the embodiments of the present invention, but also for various kinds of other type image forming apparatuses, such as a monochrome copier, a MPF (Multi Function Peripheral or Multi Function Printer) serving as either a full color functional device or monochrome functional device, etc.

According to the present invention, the following effects can be attained.

(1) According to the image processing apparatus embodied in the present invention as FIRST EMBODIMENT, it becomes possible to eliminate the deterioration of the perceptibility of the partial image area or the partial character area merely by conducting the simple operations.

(2) According to the image processing apparatus embodied in the present invention as SECOND EMBODIMENT, it becomes possible to determine the pages being suitable for applying the predetermined image processing, while alleviating the burden to be incurred to the user.

While the preferred embodiments of the present invention have been described using specific term, such description is for illustrative purpose only, and it is to be understood that changes and variations may be made without departing from the spirit and scope of the appended claims.

What is claimed is:

1. An image processing apparatus, comprising:
an image data inputting section adapted to input image data representing an original image, therefrom;
a detecting section adapted to detect attributes of each of pages included in the original image represented by the image data inputted from the image data inputting section; and
a control section that selects a set of consecutive pages, attributes of each of which, detected by the detecting section, are suitable for implementing a predetermined image processing to print plural pages within a single paper sheet, and then, applies the predetermined image processing to the consecutive pages;
wherein, when selecting plural sets of consecutive pages, which are suitable for implementing the predetermined image processing, the control section further selects a desired number of sets of consecutive pages in order of decreasing suitability for applying the image processing to each of the plural sets of consecutive pages, therefrom; and
wherein, in case of determining that it is impossible to obtain the desired number of sets from the plural sets of consecutive pages when selecting them in order of decreasing suitability thereof, the control section selects the desired number of sets of consecutive pages by giving a priority to an obtainable number of sets of consecutive pages, rather than the order of decreasing suitability.

2. The image processing apparatus of claim 1,
wherein, based on plural kinds of weighted attributes, the control section determines whether or not the attributes of each of the pages are suitable for implementing the predetermined image processing.

3. The image processing apparatus of claim 1,
wherein, when determining whether or not the attributes of each of the pages are suitable for implementing the predetermined image processing, the control section employs a combination of attributes of each of the consecutive pages as one of determination criteria.

4. The image processing apparatus of claim 1,
wherein the attributes includes at least one of a size of characters residing on a page serving as one of the pages, a size of a partial image area residing on the page concerned, a kind of the partial image area residing on the page concerned, a kind of color used for the page concerned and a density of whole image itself included in the page concerned.

5. The image processing apparatus of claim 1, further comprising:
an operating section to accept operations for establishing setting items in regard to a printing operation based on the original image and for inputting an upper limit of money amount to be charged for the printing operation;
wherein the control section compares the upper limit of money amount, inputted from the operating section, with a charged fee to be actually charged when the printing operation is implemented in accordance with the setting items established from the operating section, and when determining that the charged fee exceeds the upper limit of money amount, the control section implements the predetermined image processing.

6. The image processing apparatus of claim 1,
wherein, when a residual amount of printing agent, to be used for a printing operation based on the original image, is lower than a predetermined lower limit of the printing agent, the control section implements the predetermined image processing.

7. The image processing apparatus of claim 1,
wherein the predetermined image processing includes an integration print processing, which makes consecutive pages integrate into a single page area.

8. The image processing apparatus of claim 1,
wherein the predetermined image processing includes a duplex print processing, which makes consecutive two pages print onto both sides of the single paper sheet respectively.

9. The image processing apparatus of claim 1,
wherein, in addition to a processing for making plural pages print within the single paper sheet, the predetermined image processing further includes another processing for making a consuming amount of printing agent reduce to a level lower than that in a normal printing operation.

10. A method for implementing an image processing, comprising:
inputting image data representing an original image;
detecting attributes of each of pages included in the original image represented by the image data inputted;
selecting a set of consecutive pages, attributes of each of which are suitable for implementing a predetermined image processing to print plural pages within a single paper sheet; and
applying the predetermined image processing to the consecutive pages;
wherein, when plural sets of consecutive pages, which are suitable for implementing the predetermined image processing, are selected, a desired number of sets of consecutive pages are further selected in order of decreasing suitability for applying the image processing to each of the plural sets of consecutive pages, therefrom; and
wherein, in case of determining that it is impossible to obtain the desired number of sets from the plural sets of consecutive pages when selecting them in order of decreasing suitability thereof, the desired number of sets of consecutive pages are selected by giving a priority to an obtainable number of sets of consecutive pages, rather than the order of decreasing suitability.

11. The method of claim 10,
wherein, based on plural kinds of weighted attributes, it is determined whether or not the attributes of each of the pages are suitable for implementing the predetermined image processing.

12. The method of claim 10,
wherein, when it is determined whether or not the attributes of each of the pages are suitable for implementing the predetermined image processing, a combination of attributes of each of the consecutive pages is employed as one of determination criteria.

13. The method of claim 10,
wherein the attributes includes at least one of a size of characters residing on a page serving as one of the pages, a size of a partial image area residing on the page concerned, a kind of the partial image area residing on the page concerned, a kind of color used for the page concerned and a density of whole image itself included in the page concerned.

14. A non-transitory computer readable storage medium storing a computer executable program for implementing an image processing, the program being executable by a computer to cause the computer to perform a process comprising:
inputting image data representing an original image;
detecting attributes of each of pages included in the original image represented by the image data inputted;
selecting a set of consecutive pages, attributes of each of which are suitable for implementing a predetermined image processing to print plural pages within a single paper sheet; and
applying the predetermined image processing to the consecutive pages;
wherein, when plural sets of consecutive pages, which are suitable for implementing the predetermined image processing, are selected, a desired number of sets of consecutive pages are further selected in order of decreasing suitability for applying the image processing to each of the plural sets of consecutive pages, therefrom; and
wherein, in case of determining that it is impossible to obtain the desired number of sets from the plural sets of consecutive pages when selecting them in order of decreasing suitability thereof, the desired number of sets of consecutive pages are selected by giving a priority to an obtainable number of sets of consecutive pages, rather than the order of decreasing suitability.

15. The computer readable storage medium of claim 14,
wherein, based on plural kinds of weighted attributes, it is determined whether or not the attributes of each of the pages are suitable for implementing the predetermined image processing.

16. The computer readable storage medium of claim 14,
wherein, when it is determined whether or not the attributes of each of the pages are suitable for implementing the predetermined image processing, a combination of attributes of each of the consecutive pages is employed as one of determination criteria.

17. The computer readable storage medium of claim 14,
wherein the attributes includes at least one of a size of characters residing on a page serving as one of the pages, a size of a partial image area residing on the page concerned, a kind of the partial image area residing on the page concerned, a kind of color used for the page concerned and a density of whole image itself included in the page concerned.

* * * * *